(12) United States Patent
Nishiwaki et al.

(10) Patent No.: US 12,522,752 B2
(45) Date of Patent: Jan. 13, 2026

(54) PRESSURE-SENSITIVE ADHESIVE SHEET

(71) Applicant: NITTO DENKO CORPORATION, Ibaraki (JP)

(72) Inventors: Masataka Nishiwaki, Ibaraki (JP); Toshiki Ikami, Ibaraki (JP); Keigo Shimooka, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 327 days.

(21) Appl. No.: 18/023,613

(22) PCT Filed: Dec. 17, 2020

(86) PCT No.: PCT/JP2020/047129
§ 371 (c)(1),
(2) Date: Feb. 27, 2023

(87) PCT Pub. No.: WO2022/044355
PCT Pub. Date: Mar. 3, 2022

(65) Prior Publication Data
US 2023/0312992 A1      Oct. 5, 2023

(30) Foreign Application Priority Data
Aug. 31, 2020   (JP) .................................. 2020-146095

(51) Int. Cl.
*C09J 7/38*   (2018.01)
*C09J 11/04*   (2006.01)

(52) U.S. Cl.
CPC .............. *C09J 7/385* (2018.01); *C09J 11/04* (2013.01); *C09J 2203/326* (2013.01); *C09J 2301/302* (2020.08); *C09J 2301/408* (2020.08)

(58) Field of Classification Search
CPC ....... C09J 7/385; C09J 7/10; C09J 7/30; C09J 2301/408; C09J 2301/302; B32B 7/12
USPC ........................................................... 156/326
See application file for complete search history.

(56) References Cited

U.S. PATENT DOCUMENTS

| | | | |
|---|---|---|---|
| 11,512,232 B2 * | 11/2022 | Morioka | .................. C09J 7/385 |
| 2008/0202662 A1 | 8/2008 | Husemann et al. | |
| 2014/0044915 A1 | 2/2014 | Niwa et al. | |
| 2014/0226085 A1 | 8/2014 | Katami et al. | |

FOREIGN PATENT DOCUMENTS

| | | | |
|---|---|---|---|
| CN | 1753733 A | 3/2006 |
| CN | 101594990 A | 12/2009 |
| CN | 103421440 A | 12/2013 |
| CN | 103992753 A | 8/2014 |
| CN | 106916541 A | 7/2017 |

(Continued)

OTHER PUBLICATIONS

Request for Submission of an Opinion issued Mar. 19, 2024 in KR Application No. 10-2023-7010700.

(Continued)

*Primary Examiner* — James D Sells
(74) *Attorney, Agent, or Firm* — Sughrue Mion, PLLC

(57) ABSTRACT

Provided is a PSA sheet having limited light transmission with reduced PSA-entering light. A PSA sheet having a PSA layer is provided. The PSA layer comprising at least two species of colorants. The PSA layer has a light transmittance of 30% or lower and a light reflectance of 8% or higher.

20 Claims, 2 Drawing Sheets

(56) References Cited

FOREIGN PATENT DOCUMENTS

| | | |
|---|---|---|
| JP | 05-043846 A | 2/1993 |
| JP | 10-152658 A | 6/1998 |
| JP | 10-195405 A | 7/1998 |
| JP | 2000-313858 A | 11/2000 |
| JP | 2005-082634 A | 3/2005 |
| JP | 2006-152192 A | 6/2006 |
| JP | 2006-517874 A | 8/2006 |
| JP | 2010-505659 A | 2/2010 |
| JP | 2014-051644 A | 3/2014 |
| JP | 2014-221914 A | 11/2014 |
| JP | 2016-017113 A | 2/2016 |
| JP | 2017-119809 A | 7/2017 |
| JP | 2019-052255 A | 4/2019 |
| JP | 2020-037657 A | 3/2020 |
| KR | 10-2008-0016664 A | 2/2008 |
| KR | 10-2015-0049033 A | 5/2015 |
| KR | 10-2017-0034321 A | 3/2017 |
| WO | 2004/074007 A2 | 9/2004 |
| WO | 2004/074386 A2 | 9/2004 |
| WO | 2008/042397 A2 | 4/2008 |

OTHER PUBLICATIONS

Notice of Reasons for Refusal issued on Feb. 12, 2021 in Japanese Patent Application No. 2020-146095.
Notice of Reasons for Refusal issued on Aug. 12, 2021 in Japanese Patent Application No. 2021-080250.
Notice of Reasons for Refusal issued Oct. 21, 2021 in Japanese Patent Application No. 2021-080250.
Notice of Reasons for Refusal issued Jan. 13, 2022 in Japanese Patent Application No. 2021-080250.
International Search Report for PCT/JP2020/047129 dated Feb. 16, 2021 (PCT/ISA/210).
The First Office Action dated Jun. 27, 2025, issued in Chinese application No. 202080103626.9.

\* cited by examiner

PRESSURE-SENSITIVE ADHESIVE SHEET

TECHNICAL FIELD

The present invention relates to a pressure-sensitive adhesive sheet.

This application is a National Stage of International Application No. PCT/JP2020/047129 filed Dec. 17, 2020, claiming priority based on Japanese Patent Application No. 2020-146095 filed Aug. 31, 2020.

BACKGROUND ART

In general, pressure-sensitive adhesive (PSA) exists as a soft solid (a viscoelastic material) in a room temperature range and has a property to adhere easily to an adherend with some pressure applied. With such properties, for instance, PSA is widely used in various applications for purposes such as bonding, fixing and protecting components inside portable electronic devices such as cell phones. For instance, PSA sheets having light-blocking PSA layers are used for purposes such as preventing light leakage from self-luminous elements such as light sources and organic EL (electroluminescence) of backlight modules and the like of liquid crystal displays in portable electronic devices such as mobile phones. For purposes such as design, adherend concealment and adjustment (e.g., reduction of uneven appearance) made to the adherend appearance through the PSA sheet, PSA sheets with certain levels of light-blocking or light-dimming properties are used. Literatures related to this type of art include Patent Document 1.

CITATION LIST

Patent Literature

[Patent Document 1] Japanese Patent Application Publication No. 2020-37657

SUMMARY OF INVENTION

Technical Problem

PSA sheets with limited light transmission as described above absorb light into the PSA sheets for optical control. Even in such PSA sheets with limited light transmission, however, upon entry to the PSA, the light is refracted and diffused therein; and therefore, it is sometimes difficult to obtain optical control with higher precision. For instance, various devices such as the aforementioned portable electronic devices use optical sensors using light such as infrared (IR) light, visible light and ultraviolet (UV) light for purposes including device operation, nearby object detection, detection of the surrounding brightness (ambient light) and data communication. Refraction of the light used in an optical sensor as well as entry, refraction and diffusion of the light from outside the device may affect sensor accuracy or cause poor sensor response. It is meaningful to have capabilities for light transmission control and impact reduction of PSA-entering light as they can combine light-blocking or light-dimming properties with high-precision optical control.

The present invention has been created in view of these circumstances with an objective to provide a PSA sheet that has limited light transmission with reduced PSA-entering light.

Solution to Problem

This description provides a PSA sheet having a PSA layer. The PSA layer comprises at least two species of colorants. The PSA layer has a light transmittance of 30% or lower and an optical reflectance of 8% or higher. According to this embodiment, the PSA layer has limited light transmission and can reduce the light entering the PSA. Such a PSA sheet can combine light-blocking or light-dimming properties with high-precision optical control.

In some preferable embodiments, the colorants contained in the PSA layer are in an amount of 1% by weight or higher and 10% by weight or lower. With at least two species of colorants added in an amount corresponding to 1% to 10% by weight of the PSA layer, a light transmittance up to the prescribed value can be preferably combined with a light reflectance of at least the prescribed value. The colorants in an amount of 10% by weight or lower helps maintain adhesive properties such as adhesive strength.

In some preferable embodiments, the PSA layer comprises a black colorant as the first colorant and a metal oxide as the second colorant. The combined use of black colorant and metal oxide as the colorants can preferably combine a light transmittance up to the prescribed value with a light reflectance of at least the prescribed value.

In some preferable embodiments, the metal oxide content in the PSA layer is 1% by weight or higher and 6% by weight or lower. The metal oxide in an amount of 1% by weight or greater and 6% by weight or less can bring about a light transmittance up to the prescribed value while increasing the light reflectance. A metal oxide content up to 6% by weight helps maintain adhesive properties such as adhesive strength.

In some preferable embodiments, the black colorant content in the PSA layer is below 2% by weight. A black colorant content limited to below 2% by weight of the PSA layer can preferably combine a light transmittance up to the prescribed value with a light reflectance of at least the prescribed value.

In some preferable embodiments, the first colorant contained in an amount C1 and the second colorant contained in an amount C2 satisfy a ratio (C1/C2) by weight in the range between 0.01 and 0.30. When the first and second colorants are used at a ratio by weight in the above range, a light transmittance up to the prescribed value can be preferably combined with a light reflectance of at least the prescribed value.

The PSA layer disclosed herein may be an acrylic PSA layer comprising an acrylic polymer as a base polymer. In an embodiment having an acrylic PSA layer, the art disclosed herein can be preferably implemented.

In some preferable embodiments, the PSA layer has a thickness in the range of 10 μm to 50 μm. With the PSA layer thickness being 10 μm or greater, a light transmittance up to the prescribed value can be preferably combined with a light reflectance of at least the prescribed value. It also tends to bring about the adhesive properties more easily. With the PSA layer thickness being 50 μm or less, it may well accommodate needs for thinning (thickness reduction) and weight saving.

In some preferable embodiments, it is an adhesively double-faced PSA sheet formed of the PSA layer and is free of a substrate. Having no substrate, the double-faced PSA sheet free of a substrate can be made thinner by that much, possibly contributing to downsizing and space saving in products to which the double-faced PSA sheet is applied. In a substrate-free PSA sheet, the effect of the PSA layer such as adhesive strength and impact resistance can be maximized.

The PSA sheet disclosed herein can be preferably used in order to bond a member of a portable electronic device. For instance, the portable electronic device may include an optical sensor. Optical control by using the PSA sheet disclosed herein can thus lead to impact reduction on operation of the optical sensor. As described above, among portable electronic devices, those having light sources need to be prevented from light leakage. In some cases, adherend concealment and designability may be required. Accordingly, it is particularly significant to apply the art disclosed herein to limit light transmission and reduce the PSA-entering light for optical control.

DESCRIPTION OF EMBODIMENTS

Figure 1:
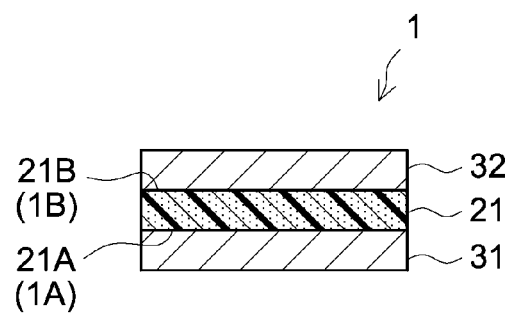
FIG. 1 shows a cross-sectional diagram schematically illustrating a structural example of the PSA sheet.

Preferable embodiments of the present invention are described below. Matters necessary to practice this invention other than those specifically referred to in this description may be comprehended by a person of ordinary skill in the art based on the instruction regarding implementations of the invention according to this description and the common technical knowledge in the pertinent field. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate sizes or reduction scales of the PSA sheet to be provided as an actual product by the present invention.

As used herein, the term "PSA" refers to, as described earlier, a material that exists as a soft solid (a viscoelastic material) in a room temperature range and has a property to adhere easily to an adherend with some pressure applied. As defined in "Adhesion: Fundamental and Practice" by C. A. Dahlquist (McLaren & Sons (1966), P. 143), PSA referred to herein may generally be a material that has a property satisfying complex tensile modulus $E^*(1\ Hz) < 10^7\ dyne/cm^2$ (typically, a material that exhibits the described characteristics at 25° C.).

<Constitutional Examples of PSA Sheet>

The PSA sheet disclosed herein can be a substrate-supported PSA sheet having a PSA layer on one or each face of a non-releasable substrate (support substrate), or a substrate-free PSA sheet (i.e., a PSA sheet free of a non-releasable substrate) in the form of a PSA layer held on a release liner. The concept of PSA sheet herein may encompass so-called PSA tape, PSA labels, PSA film, etc. The PSA sheet disclosed herein can be in a roll or in a flat sheet. Alternatively, the PSA sheet may be processed into various shapes.

FIG. 1 illustrates a structural example of the substrate-free adhesively double-faced PSA sheet (substrate-free double-faced PSA sheet). In a PSA sheet 1 shown in FIG. 1, both faces 21A and 21B of a substrate-free PSA layer 21 (which are also adhesive faces 1A and 1B of PSA sheet 1) are protected with release liners 31 and 32, respectively, each liner having a release face on at least the PSA layer side. Alternatively, the PSA sheet may be in an embodiment where one surface (adhesive face, the first adhesive face) of a substrate-free PSA layer is protected with a release liner having a release face on each side. This can be wound so that the other surface (adhesive face, the second adhesive face) of the PSA layer is brought into contact with the release liner's backside, with the PSA layer's second adhesive face also protected with the release liner. From the viewpoint of reducing the PSA sheet thickness, the art disclosed herein can be preferably implemented in such a substrate-free form. The substrate-free PSA sheet can be easily made thinner and is also advantageous for possible maximization of PSA properties such as adhesive strength and impact resistance. It is noted that, as described later, PSA layer 21 comprises at least two species of colorants and has a light transmittance limited to up to 30%.

<Properties of PSA Layer>

(Light Transmittance)

The PSA layer constituting the PSA sheet disclosed herein has a light transmittance of 30% or lower. The PSA sheet having such a PSA layer may have light-blocking properties suited for preventing light leakage. It is also suited for adherend concealment and adherend appearance adjustment (e.g., reduction of uneven appearance) through the PSA sheet and can provide designability. The PSA layer has a light transmittance of preferably 28% or lower, more preferably 25% or lower, yet more preferably 20% or lower, or possibly even 18% or lower. In some preferable embodiments, the PSA layer's light transmittance is below 12%, possibly below 10%, below 8.0%, below 6.0%, below 4.0%, or even below 3.0%. With decreasing light transmittance, it can exhibit superior light-blocking properties and concealing properties. The minimum light transmittance is not particularly limited. It can be essentially 0%, that is, at or below detection limit. From the standpoint of simultaneously obtaining an undermentioned light reflectance, it can also be 0.05% or higher, 0.1% or higher, 1.0% or higher, 2.0% or higher, or even 5.0% or higher. In some embodiments, the PSA layer has a light transmittance of 8.0% or higher, or possibly 12% or higher (e.g., 15% or higher). A certain level of light transmittance enables suitable adherend concealment, appearance adjustment of adherend (e.g., a metal material) and providing design features while retaining the adherend texture. The PSA layer with suitable light transmission is preferable also from the standpoint of maintaining adhesive properties, the efficiency of manufacturing, etc.

The light transmittance of the PSA layer can be determined by the method described later in Examples. The light transmittance of the PSA layer can be adjusted through PSA components (e.g., species of colorant (favorably of black colorant) and the amount thereof), PSA layer thickness, etc.

(Light Reflectance)

The PSA layer has a light reflectance of 8.0% or higher. PSA layers with limited light transmittances as described above have limited amounts of entering light. Even in such PSA layers, however, upon entry to the PSA, the light is refracted and diffused therein; and therefore, it is sometimes difficult to obtain optical control with higher precision. In addition to limiting the PSA layer's light transmittance, by having a light reflectance of 8% or higher on the PSA layer surface to reflect light on the particular adhesive face and reduce the PSA-entering light, it is possible to combine light-blocking or light-dimming properties with high-precision optical control. The PSA layer has a light reflectance of preferably 9.0% or higher, more preferably 10% or higher, yet more preferably 12% or higher, or possibly even 14% or higher (e.g., 16% or higher). The maximum light reflectance is set in a suitable range in relation to the light transmittance and thus is not limited to a specific range. It is, for instance, below 40%, possibly 30% or lower, or even 20% or lower (e.g., 15% or lower).

The light reflectance of the PSA layer can be determined by the method described later in Examples. The light reflectance of the PSA layer can be adjusted through PSA components (e.g., species of colorant (favorably of metal oxide) and the amount thereof).

In case of a double-faced PSA sheet having an adhesive face on each side, the respective PSA layer surfaces (respective adhesive faces; the first and second adhesive faces) may have the same or different light reflectances. In an embodiment of the double-faced PSA sheet whose respective PSA layer surfaces (respective adhesive faces) have different light reflectances, it is only necessary for one PSA layer surface (e.g., the first adhesive face) to have an aforementioned light reflectance; and the other PSA layer surface (e.g., the second adhesive face) may have a light reflectance below 8%.

As for the PSA layer, the relationship between light transmittance and light reflectance is not particularly limited. They can be suitably set to have a relationship that better combines reduction of light transmission with reduction of the light entering the PSA layer. For instance, the PSA layer's ratio (R/T) of light reflectance R to light transmittance T is suitably 0.4 or higher, preferably 0.5 or higher, more preferably 1.0 or higher, yet more preferably 2.0 or higher, or particularly preferably 4.0 or higher (e.g., 4.5 or higher). The maximum R/T ratio value is about 10 or lower, for instance, possibly 5 or lower. In an embodiment requiring the PSA layer to have a certain level of light transmission, the R/T ratio value can be below 3, below 2, or even below 1.

<Psa Layer>
(Base Polymer)

In the art disclosed herein, the type of the PSA constituting the PSA layer is not particularly limited. The PSA layer may comprise, as adhesive polymer (or "base polymer" hereinafter, meaning a structural polymer that forms the PSA), one, two or more species among various rubber-like polymers such as acrylic polymer, rubber-based polymer (natural rubber, synthetic rubber, a mixture of these, etc.), polyester-based polymer, urethane-based polymer, polyether-based polymer, silicone-based polymer, polyamide-based polymer, and fluoropolymer that can be used in the PSA field. From the standpoint of the adhesive properties, cost, etc., a preferable PSA comprises an acrylic polymer or a rubber-based polymer as the base polymer. In particular, an acrylic PSA (a PSA whose base polymer is an acrylic polymer) is preferable. In the following, a PSA sheet having an acrylic PSA layer (i.e., a PSA layer formed of an acrylic PSA) is mainly described; however, the PSA layer in the PSA sheet disclosed herein is not to be limited to those formed of acrylic PSA. The art disclosed herein is preferably implemented in an embodiment using an acrylic PSA.

In the following, a PSA sheet having an acrylic PSA layer (i.e., a PSA layer formed of an acrylic PSA) is mainly described; however, the PSA layer in the PSA sheet disclosed herein is not to be limited to those formed of acrylic PSA.

The "base polymer" of a PSA refers to a rubber-like polymer in the PSA. Besides this, it is not limited to a particular interpretation. The rubber-like polymer refers to a polymer that shows rubber elasticity around room temperature. As used herein, the "main component" (primary component) refers to a component accounting for more than 50% by weight.

The "acrylic polymer" refers to a polymer that includes a monomeric unit derived from a monomer having at least one (meth)acryloyl group per molecule. Hereinafter, a monomer having at least one (meth)acryloyl group per molecule is referred to as an "acrylic monomer." Thus, as used herein, the acrylic polymer is defined to be a polymer that includes a monomeric unit derived from an acrylic monomer. Typical examples of the acrylic polymer include an acrylic polymer in which the acrylic monomer accounts for more than 50% by weight of all monomers used in synthesizing the acrylic polymer.

As used herein, the term "(meth)acryloyl" is meant to be inclusive of acryloyl and methacryloyl. Likewise, "(meth)acrylate" means acrylate and methacrylate, and "(meth)acryl" is meant to be inclusive of acryl and methacryl respectively.

(Acrylic Polymer)

A preferable example of the acrylic polymer in the art disclosed herein is a polymer formed from a starting monomer mixture that comprises an alkyl (meth)acrylate as the primary monomer. Here, the primary monomer refers to a component that accounts for more than 50% by weight of the monomer composition of the starting monomer mixture.

For example, a compound represented by the following formula (1) can be advantageously used as the alkyl (meth)acrylate.

$$CH_2=C(R^1)COOR^2 \quad (1)$$

Here, $R^1$ in the formula (1) is a hydrogen atom or a methyl group. $R^2$ is an acyclic alkyl group having 1 to 20 carbon atoms (hereinafter such a range of the number of carbon atoms may be expressed as "$C_{1\text{-}20}$"). From the standpoint of the storage elastic modulus of the PSA and the like, the primary monomer is suitably an alkyl (meth)acrylate in which $R^2$ is a acyclic $C_{1\text{-}14}$ (e.g., $C_{2\text{-}10}$, typically $C_{4\text{-}8}$) alkyl group. From the standpoint of the adhesive properties, the primary monomer is preferably an alkyl acrylate in which $R^1$ is a hydrogen atom and $R^2$ is an acyclic $C_{4\text{-}8}$ alkyl group (which may also be simply referred to as a $C_{4\text{-}8}$ alkyl acrylate).

Specific examples of the alkyl (meth)acrylate having a $C_{1\text{-}20}$ acyclic alkyl group for $R^2$ include, but are not limited to, methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. These alkyl (meth)acrylates can be used singly as one species or in a combination of two or more species. Favorable examples of the alkyl (meth)acrylate include n-butyl acrylate (BA) and 2-ethylhexyl acrylate (2EHA).

Typically, the amount of the alkyl (meth)acrylate among the monomeric components constituting the acrylic polymer is more than 50% by weight, for example 70% by weight or more, may be 85% by weight or more, or may be even 90% by weight or more. The maximum percent alkyl (meth) acrylate is not particularly limited. It is preferably 99.5% by weight or less (e.g., 99% by weight or less); or from the standpoint of preferably obtaining properties (e.g., cohesive strength) based on a secondary monomer such as a carboxy group-containing monomer, it may be 98% by weight or less (e.g., less than 97% by weight). Alternatively, the acrylic polymer may be a polymer essentially formed of an alkyl (meth)acrylate.

When using a $C_{4-8}$ alkyl acrylate as a monomer, of the alkyl (meth)acrylate content of the monomers, the $C_{4-8}$ alkyl acrylate accounts for preferably 70% by weight or more, or more preferably 90% by weight or more.

A secondary monomer may be copolymerized in the acrylic polymer in the art disclosed herein. Secondary monomers can introduce functional groups capable of constituting cross-linking points in the acrylic polymer or can contribute to increasing adhesive strength. Examples of such secondary monomers include carboxy group-containing monomers, hydroxyl group (OH group)-containing monomers, acid anhydride group-containing monomers, amide group-containing monomers, amino group-containing monomers, epoxy group-containing monomers, cyano group-containing monomers, keto group-containing monomers, monomers having a nitrogen atom-containing ring, alkoxysilyl group-containing monomers and imide group-containing monomers. For the secondary monomer, solely one species or a combination of two or more species can be used.

A preferable example of the acrylic polymer in the art disclosed herein is an acrylic polymer in which a carboxy group-containing monomer is copolymerized as the secondary monomer. Examples of the carboxy group-containing monomer include acrylic acid (AA), methacrylic acid (MAA), carboxyethyl (meth)acrylate, carboxypentyl (meth) acrylate, itaconic acid, maleic acid, fumaric acid, crotonic acid, and isocrotonic acid. In particular, AA and MAA are preferable.

Other favorable examples include an acrylic polymer in which a hydroxy group-containing monomer is copolymerized as the secondary monomer. Examples of hydroxy group-containing monomers include hydroxyalkyl (meth) acrylates such as 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth) acrylate; polypropylene glycol mono (meth)acrylate; and N-hydroxyethyl (meth)acrylamide. A particularly preferable hydroxy group-containing monomer is a hydroxyalkyl (meth)acrylate having a linear alkyl group with 2 to 4 carbon atoms.

When the monomers forming the acrylic polymer include an aforementioned functional group-containing monomer, the amount of the functional group-containing monomer among the monomeric components is not particularly limited. From the standpoint of suitably exhibiting the effect of using the functional group-containing monomer, the amount of the functional group-containing monomer among the monomeric components can be, for example, 0.1% by weight or more, a suitable amount is 0.5% by weight or more, and this amount may be 1% by weight or more. From the standpoint of facilitating the balance of adhesive performance in relation to the primary monomer, a suitable amount of the functional group-containing monomer among the monomeric components is 40% by weight or less, and this amount is preferably 20% by weight or less, or may be 10% by weight or less (e.g., 5% by weight or less).

In the base polymer according to some preferable embodiments, the monomers forming the base polymer (e.g., acrylic polymer) may include a carboxy group-containing monomer. The monomers including the carboxy group-containing monomer are likely to result in a PSA sheet showing good adhesive properties (cohesive strength, etc.). This can be advantageous in improving the tightness of adhesion between the PSA layer and the adherend. Furthermore, for instance, when a black colorant such as carbon black is added to the PSA, copolymerization of a carboxy group-containing monomer in a suitable amount facilitates dispersion of the colorant in the layer and the adhesive properties can be preferably retained.

In an embodiment in which a carboxy group-containing monomer is copolymerized in the base polymer, the amount of carboxy group-containing monomer in the monomers forming the base polymer is not particularly limited and it can be, for example, 0.2% by weight or more (typically 0.5% by weight or more) of the monomers. It is suitably 1% by weight or more or can be 2% by weight or more, or even 3% by weight or more. With more than 3% carboxy group-containing monomer by weight, a greater effect can be obtained. In some embodiments, the amount of carboxy group-containing monomer in the monomers can be 3.2% by weight or more, 3.5% by weight or more, 4% by weight or more, or even 4.5% by weight or more. The maximum amount of carboxy group-containing monomer is not particularly limited. For instance, it can be 15% by weight or less, 12% by weight or less, or even 10% by weight or less. The art disclosed herein can be preferably implemented in an embodiment in which the carboxy group-containing monomer content is 7% by weight or less (typically less than 7% by weight, e.g., 6.8% by weight or less, or 6.0% by weight or less).

The monomers forming the acrylic polymer may include other comonomer besides the secondary monomer for the purpose of improving the cohesiveness or the like. Examples of the other comonomer include vinyl ester monomers such as vinyl acetate, vinyl propionate, and vinyl laurate; aromatic vinyl compounds such as styrene, substituted styrene (α-methylstyrene and the like), and vinyl toluene; cycloalkyl (meth)acrylates such as cyclohexyl (meth)acrylate, cyclopentyl (meth)acrylate, and isobornyl (meth)acrylate; aromatic ring-containing (meth)acrylates such as aryl (meth) acrylates (e.g., phenyl (meth)acrylate), aryloxyalkyl (meth) acrylates (e.g., phenoxyethyl (meth)acrylate), and arylalkyl (meth)acrylates (e.g., benzyl (meth)acrylate); olefinic monomers such as ethylene, propylene, isoprene, butadiene, and isobutylene; chlorine-containing monomers such as vinyl chloride and vinylidene chloride; isocyanate group-containing monomers such as 2-(meth)acryloyloxyethyl isocyanate; alkoxy group-containing monomers such as methoxyethyl (meth)acrylate and ethoxyethyl (meth)acrylate; vinyl ether monomers such as methyl vinyl ether and ethyl vinyl ether; and polyfunctional monomers having two or more (e.g., three or more) polymerizable functional groups (e.g., (meth) acryloyl groups) in a molecule, such as 1,6-hexanediol di(meth)acrylate and trimethylolpropane tri(meth)acrylate.

The amount of such other comonomer is not particularly limited and may be suitably selected according to the purpose and application. From the standpoint of suitably obtaining the effect of the use thereof, a suitable amount is 0.05% by weight or more, and this amount may be 0.5% by weight or more. From the standpoint of facilitating the balance of the PSA performance, a suitable amount of the other copolymerizable component among the monomeric components is 20% by weight or less, and this amount may be 10% by weight or less (e.g., 5% by weight or less). The art disclosed herein also can be preferably implemented in an embodiment in which the monomeric components include substantially no other copolymerizable components. Here, the expression that the monomeric components include substantially no other copolymerizable monomers means that no other copolymerizable monomers is used at least intentionally. For example, it may be permitted that about 0.01% by weight or less of other copolymerizable monomers is included unintentionally.

The copolymer composition of the acrylic polymer can be suitably designed so that the polymer has a glass transition temperature (Tg) of about −15° C. or below (e.g., about −70° C. or above and −15° C. or below). Here, the acrylic polymer's Tg refers to the Tg value determined by the Fox equation based on the composition of the monomers used in the synthesis of the polymer. As shown below, the Fox equation is a relational expression of the Tg of a copolymer and the glass transition temperatures Tgi of the homopolymers obtained by homopolymerization of the monomers constituting the copolymer.

$$1/Tg = \Sigma(Wi/Tgi)$$

In the Fox equation above, Tg represents the glass transition temperature (unit: K) of the copolymer, Wi the weight fraction (copolymerization ratio by weight) of a monomer i in the copolymer, and Tgi the glass transition temperature (unit: K) of the homopolymer of the monomer i.

As for the glass transition temperatures of homopolymers used in Tg determination, the values used are found in a known document, in particular, in "*Polymer Handbook*" (3rd edition, John Wiley & Sons, Inc., Year 1989). When the literature provides two or more values, the highest value is used. In the case where the values are not described in the Polymer Handbook, values obtained by the measuring method described in Japanese Patent Application Publication No. 2007-51271 are used.

While no particular limitations are imposed, from the standpoint of the impact resistance and tightness of adhesion to an adherend, the Tg of the acrylic polymer is advantageously about −25° C. or lower, preferably about −35° C. or lower, and more preferably about −40° C. or lower, but these values are not particularly limiting. In some embodiments, from the standpoint of cohesiveness, the Tg of the acrylic polymer may be, for example, about −70° C. or higher, about −65° C. or higher, about −60° C. or higher, or even about −55° C. or higher. The art disclosed herein can be preferably implemented in an embodiment in which the Tg of the acrylic polymer is about −65° C. or higher and about −35° C. or lower (e.g., about −55° C. or higher and about −40° C. or lower). The Tg of the acrylic polymer can be adjusted by suitably changing the monomer composition (that is, the type of monomers used for synthesizing the polymer and the ratio of the amounts used).

The method for obtaining the acrylic polymer is not particularly limited. Various polymerization methods known as synthetic means for acrylic polymers can be suitably employed, with the methods including solution polymerization method, emulsion polymerization, bulk polymerization, suspension polymerization, and photopolymerization. For example, a solution polymerization method can be preferably used. The polymerization temperature in the solution polymerization can be suitably selected according to the types of monomers and solvent to be used, the type of polymerization initiator, and the like. It can be, for example, about 20° C. to 170° C. (typically, about 40° C. to 140° C.).

As for the solvent (polymerization solvent) used in solution polymerization, a suitable species can be selected among heretofore known organic solvents (toluene, ethyl acetate, etc.). The initiator used for polymerization can be suitably selected among heretofore known polymerization initiators (e.g., azo-based polymerization initiators such as 2,2'-azobisisobutyronitrile (AIBN), peroxide-based initiators, etc.) according to the type of polymerization method. The polymerization initiator can be used in a typical amount, for example, about 0.005 part to 1 part by weight (typically, about 0.01 part to 1 part by weight) to 100 parts by weight of the monomers.

The weight average molecular weight (Mw) of the base polymer (preferably acrylic polymer) in the art disclosed herein is not particularly limited, and may be, for example, in the range of about $10 \times 10^4$ to $500 \times 10^4$. From the standpoint of the adhesive properties, the Mw of the base polymer is in the range of about $30 \times 10^4$ to $200 \times 10^4$ (more preferably, about $45 \times 10^4$ to $150 \times 10^4$, typically about $65 \times 10^4$ to $130 \times 10^4$). Here, Mw refers to a value obtained based on polystyrene standards by gel permeation chromatography (GPC). As the GPC apparatus, for example, model name "HLC-8320 GPC" (column: TSK gel GMH-H (S), available from Tosoh Corporation) can be used.

(Colorant)

The PSA layer disclosed herein comprises at least two species of colorants (the first and second colorants). The use of two or more species of colorants can preferably bring about a PSA layer that satisfies the light transmittance up to 30% and the light reflectance of at least 8%. As the colorant, it is possible to use various materials that can attenuate the light advancing inside the PSA layer by absorption as well as various materials that can reduce the amount of light entering the PSA layer. The colorant may have a color of, for instance, black, gray, white, red, blue, yellow, green, yellow-green, orange, purple, gold, silver and pearl. The PSA layer may include the colorant typically dispersed (possibly dissolved) in the components of the PSA layer. As the colorant, heretofore known pigments and dye can be used. The pigments include inorganic and organic pigments.

(First Colorant)

The first colorant in the PSA layer is not particularly limited. For instance, it is a component capable of absorbing and attenuating the light advancing inside the PSA layer, or it can be a component that reduces the PSA layer's light transmittance by the inclusion of the colorant in the PSA layer (thus also called "light transmittance-lowering component"). As such a first colorant, a black colorant can be preferably used because it allows efficient adjustment to the light-blocking properties in a small amount. Specific examples of the black colorant include carbon black, graphite, aniline black, perylene black, cyanine black, black titanium oxide, inorganic pigment hematite, activated carbon, molybdenum disulfide, chromium complexes, and anthraquinone-based colorants. For the black colorant, solely one species or a suitable combination of two or more species can be used.

In some preferable embodiments, the PSA layer comprises carbon black particles as the first colorant. As the carbon black particles for use, species generally called carbon black (furnace black, channel black, acetylene black, thermal black, lamp black, turpentine soot, etc.) can be used without particular limitations. As the carbon black particles, it is also possible to use surface-modified carbon black particles having a functional group such as carboxy group, amino group, sulfonate group and silicon-containing group (e.g., alkoxysilyl group, alkylsilyl group). Such surface-modified carbon black particles are also called self-dispersible carbon black with which dispersant addition may be unnecessary or the amount added can be reduced. For the carbon black particles, solely one species or a combination of two or more species can be used.

A particulate colorant (pigment) can be preferably used because it allows efficient adjustment to the light-blocking properties in a small amount. In some preferable embodiments, a colorant (e.g., a particulate black colorant such as carbon black) having a mean particle diameter of about 10 nm or larger (e.g., about 30 nm or larger) can be used. The mean particle diameter can be, for instance, about 50 nm or greater, possibly about 100 nm or greater, or even about 150 nm or greater. The maximum mean particle diameter of the colorant is not particularly limited. For instance, it is about 3000 nm or less, or possibly about 1000 nm or less. From the standpoint of increasing the light-blocking properties, the colorant's mean particle diameter can be suitably about 500 nm or less, preferably about 300 nm or less, more preferably about 250 nm or less, or yet more preferably 200 nm or less (e.g., about 120 nm or less, or even about 100 nm or less).

Here, the mean particle diameter of a colorant refers to the median volume diameter, in particular, the particle diameter at the 50th percentile (the 50th-percentile particle diameter, which may be abbreviated as $D_{50}$ hereinafter) in its size distribution obtained by a particle size meter based on laser scattering/diffraction. As the analyzer, for instance, product name MICROTRAC MT3000II available from Microtrac-BEL Corporation or a comparable product can be used.

In the art disclosed herein, the form of addition of a colorant (favorably a black colorant such as carbon black particles) to the PSA composition is not particularly limited. The colorant such as carbon black particles can be added to the PSA composition in the form of a dispersion in which the particles are dispersed in a dispersion medium. The dispersion medium forming the dispersion is not particularly limited. Examples include water (ion-exchanged water, reverse osmosis water, distilled water, etc.), various organic solvents (alcohols such as ethanol; ketones such as acetone; ethers such as butyl cellosolve, propylene glycol monomethyl ether acetate; esters such as ethyl acetate; aromatic hydrocarbons such as toluene; mixed solvents of these), and aqueous mixed solvents of water and these organic solvents. The dispersion may also comprise an aforementioned dispersant. By mixing the dispersion with a PSA composition, the PSA composition may also further comprise the dispersant while comprising the colorant (favorably a black colorant such as carbon black particles).

The amount of the first colorant (favorably a black colorant such as carbon black particles) can be suitably selected in view of the light-blocking or light-dimming properties to be obtained, required adhesive properties, etc. It is not limited to a specific range. The first colorant content may also vary depending on the PSA species, the first colorant's shape and particle diameter, compatibility with the PSA, etc. The first colorant content of the PSA layer is suitably about 0.01% by weight or higher (e.g., 0.05% by weight or higher). From the standpoint of the light-blocking properties, it is preferably about 0.1% by weight or higher, more preferably about 0.2% by weight or higher, yet more preferably about 0.3% by weight or higher, particularly preferably about 0.4% by weight or higher, or possibly even, for instance, about 0.5% by weight or higher. The amount of the first colorant (favorably a black colorant such as carbon black particles) is possibly about 10% by weight or lower, or suitably about 3% by weight or lower. From the standpoint of combining a light transmittance up to the prescribed value with at least the prescribed light reflectance, it is preferably about 2% by weight or lower (typically below 2% by weight), more preferably about 1% by weight or lower, yet more preferably about 0.6% by weight or lower, possibly about 0.5% by weight or lower (e.g., 0.4% by weight or lower), 0.3% by weight or lower, or even 0.2% by weight or lower. Limiting the first colorant content tends to help maintain adhesive properties such as bonding strength.

(Second Colorant)

The second colorant in the PSA layer is not particularly limited. For instance, it is a component capable of reducing the amount of light entering the PSA layer, or it can be a component that increases the PSA layer's light reflectance by the inclusion of the second colorant in the PSA layer (thus also called "light reflectance enhancer"). Such second colorant(s) can be one, two or more species selected among inorganic materials (e.g., metals, metal compounds), organic materials and organic/inorganic composites. Specific examples of the second colorant include inorganic materials such as metal oxides like titanium oxides (titanium dioxides such as rutile titanium dioxide and anatase titanium dioxide), zinc oxide, cerium oxide, aluminum oxide, silicon oxide, zirconium oxide, magnesium oxide, calcium oxide, tin oxide, barium oxide, cesium oxide and yttrium oxide; carbonates such as magnesium carbonate, calcium carbonate (light calcium carbonate, heavy calcium carbonate, etc.), barium carbonate and zinc carbonate; hydroxides such as aluminum hydroxide, calcium hydroxide, magnesium hydroxide and zinc hydroxide; silicates such as aluminum silicate, magnesium silicate and calcium silicate; barium sulfate, calcium sulfate, barium stearate, zinc flower, zinc sulfide, talc, clay, kaolin, titanium phosphate, mica, gypsum, white carbon, diatomaceous earth, bentonite, lithopone, zeolite, sericite and hydrated halloysite; as well as organic materials such as acrylic resins, polystyrene-based resins, polyurethane-based resins, amide-based resins, polycarbonate-based resins, silicone-based resins, urea-formaldehyde-based resins and melamine-based resins. These may be called white colorants. For the second colorant, solely one species or a combination of two or more species can be used. The second colorant does not include carbon black particles and can be defined as a colorant different from carbon black particles. Typically, the second colorant is free of a light-absorbing black colorant.

In some preferable embodiments, the PSA layer comprises a metal oxide as the second colorant. The combined use of the first colorant (favorably a black colorant) and a metal oxide can preferably combine a light transmittance up to the prescribed value with at least the prescribed light reflectance. As the metal oxide, a species capable of bringing about a desirable light reflectance can be selected among the aforementioned materials. Favorable examples include titanium oxides, zinc oxide, cerium oxide, aluminum oxide, silicon oxide, zirconium oxide, magnesium oxide and calcium oxide. Among them, titanium oxides, silicon oxide and zirconium oxide are preferable. Titanium oxides are particularly preferable. For the metal oxide, solely one species or a combination of two or more species can be used.

In an embodiment where the second colorant is in particle form, the second colorant (favorably metal oxide particles) is not particularly limited in mean particle diameter. In accordance with the PSA layer thickness, PSA species, etc., it is possible to use particles having suitable sizes capable of bringing about desirable light reflectance enhancement. The second colorant has a mean particle diameter of, for instance, possibly about 1 nm or greater, or suitably about 5 nm or greater. From the standpoint of the effect (e.g., light reflectance enhancement) of including the second colorant, compatibility, handling properties, etc., the second colorant's mean particle diameter is preferably about 10 nm or greater, possibly about 20 nm or greater, or even about 30 nm or greater. In view of maintaining adhesive properties, etc., the maximum mean particle diameter is suitably, for instance, about 300 nm or less. From the standpoint of the effect (e.g., light reflectance enhancement) of including the second colorant, etc., it is preferably less than 100 nm (e.g., 90 nm or less), more preferably about 70 nm or less, possibly about 50 nm or less, or even about 35 nm or less (e.g., about 25 nm or less).

The amount of the second colorant (favorably a metal oxide) in the PSA layer is suitably selected in view of the effect (e.g., light reflectance enhancement) of including the second colorant, required adhesive properties, etc. It is not limited to a specific range. The second colorant content may also vary depending on the PSA species, the second colorant's shape and particle size, compatibility with the PSA, etc. From the standpoint of effectively obtaining the effect (e.g., light reflectance enhancement) of including the second colorant, the second colorant content in the PSA layer is suitably about 1% by weight or higher, preferably about 2% by weight or higher, more preferably about 3% by weight or higher, yet more preferably about 4% by weight or higher, or possibly even about 5% by weight or higher. From the standpoint of the compatibility with PSA components, maintaining adhesive properties such as adhesive strength and impact resistance, etc., the second colorant content in the PSA layer is possibly about 20% by weight or lower (e.g., below 20% by weight), suitably about 10% by weight or lower, preferably about 6% by weight or lower, or possibly even about 5% by weight or lower.

The ratio of an amount C1 of the first colorant to an amount C2 of the second colorant is suitably selected so as to obtain both the target light transmittance and light reflectance. It is not limited to a specific range. In some embodiments, the weight ratio (C1/C2) of amount C1 of the first colorant (favorably a black colorant) to amount C2 of the second colorant (favorably a metal oxide) is 0.001 or higher, possibly 0.005 or higher, 0.01 or higher, 0.05 or higher, 0.08 or higher, or even 0.10 or higher (e.g., 0.12 or higher). With increasing weight ratio (C1/C2), the effect of adding the first colorant is preferably obtained. In an embodiment where the first colorant is a black colorant, the PSA layer tends to have greater light-blocking properties. In some embodiments, the weight ratio (C1/C2) is 0.50 or lower, possibly 0.40 or lower (e.g., 0.35 or lower), preferably 0.30 or lower, also possibly 0.20 or lower, 0.15 or lower, 0.12 or lower, 0.09 or lower, or even 0.06 or lower (e.g., 0.03 or lower). With decreasing weight ratio (C1/C2), the effect of adding the second colorant is preferably obtained. In an embodiment where the second colorant is a metal oxide, the PSA layer tends to have a higher light reflectance.

In an embodiment where the PSA layer comprises a black colorant as the first colorant and a metal oxide as the second colorant, the amount of other colorant besides the black colorant and the metal oxide is not particularly limited. It is, for instance, possibly below 30% by weight, preferably below 10% by weight, also possibly, for instance, below 5.0% by weight, or even below 3.0% by weight (e.g., below 2.0% by weight, or even below 1% by weight). The art disclosed herein can be implemented in an embodiment having a PSA layer essentially free of other colorants besides the black colorant and the metal oxide. As used herein, "essentially free of" means absence of deliberate addition. For instance, the amount in the PSA layer can be 0.3% by weight or less (e.g., 0.1% by weight or less, or typically 0.01% by weight or less).

In view of the compatibility with adhesive components, as the colorants, the materials shown as examples of colorants (particulate colorants) can be used upon a surface treatment with a surface treatment agent. As the surface treatment, a suitable treatment can be selected in accordance with the species of core particles, the kind of dispersion medium, etc.; and therefore, it is not limited to a specific treatment.

The PSA composition disclosed herein may comprise a component that contributes to enhancement of the colorant dispersity. The dispersity enhancer can be, for instance, a polymer, oligomer, liquid resin or surfactant (anionic, cationic, nonionic or amphoteric surfactant). As the dispersity enhancer, solely one species or a combination of two or more species can be used. The dispersity enhancer is preferably dissolved in the PSA composition. The oligomer can be a low molecular weight polymer formed of monomers including one, two or more species of acrylic monomer as the examples shown earlier (e.g., an acrylic oligomer having a Mw below about $10 \times 10^4$, or preferably below $5 \times 10^4$). The liquid resin can be, for instance, a tackifier resin (typically, a rosin-based, terpene-based, or hydrocarbon-based tackifier resin, or the like, e.g., hydrogenated rosin methyl ester, etc.). Such a dispersity enhancer can inhibit uneven dispersion of the colorant (e.g., particulate black colorant such as carbon black) and further inhibit uneven coloring of the PSA layer. Therefore, a PSA layer can be formed with a good appearance.

The way of adding the dispersity enhancer is not particularly limited. It may be included in a solution containing a colorant (e.g., a black colorant such as carbon black particles) before added to the PSA composition; or it may be supplied to the PSA composition simultaneously with a colorant, or before or after colorant addition.

The amount of dispersity enhancer is not particularly limited. From the standpoint of reducing its influence on the adhesive properties (e.g., lowering of the cohesion), relative to the entire PSA layer, it is suitably about 20% by weight or less (preferably about 10% by weight or less, more preferably 7% by weight or less, e.g., about 5% by weight or less). In some embodiments, the amount of dispersity enhancer can be up to about 10-fold (preferably up to about 5-fold, e.g., up to about 3-fold) of the colorant's weight. On the other hand, from the standpoint of favorably obtaining the effect of dispersity enhancer, its amount is suitably about 0.2% by weight or more (typically about 0.5% by weight or more, preferably about 1% by weight or more) of the entire PSA layer. In some embodiments, the amount of dispersity enhancer can be at least about 0.2-fold (preferably at least about 0.5-fold, e.g., at least 1-fold) of the colorant's weight.

The amount (total amount, combined amount) of at least two species of colorants in the PSA layer is suitably selected in order to obtain both the target light transmittance and light reflectance as well as in view of required adhesive properties, etc. It is not limited to a specific range. The total colorant content in the PSA layer is suitably about 1% by weight or higher, preferably about 2% by weight or higher, more preferably about 3% by weight or higher, yet more preferably about 4% by weight or higher, or possibly even about 5% by weight or higher. From the standpoint of the compatibility with PSA components, maintaining adhesive properties such as adhesive strength and impact resistance, etc., the total colorant content in the PSA layer is possibly about 30% by weight or lower, suitably about 10% by weight or lower, preferably about 6% by weight or lower, or possibly even about 5% by weight or lower.

(Tackifier Resin)

The PSA layer in the art disclosed herein may include a tackifier resin. This can increase the peel strength of the PSA sheet. As the tackifier resin, one, two or more species can be used, selected among various known tackifier resins such as phenolic tackifier resins, terpene tackifier resins, modified terpene tackifier resins, rosin tackifier resins, hydrocarbon tackifier resins, epoxy tackifier resins, polyamide tackifier resins, elastomer tackifier resins, and ketone tackifier resins. In particular, phenolic tackifier resins, terpene-based tackifier resins and modified terpene-based tackifier resins are preferable, with phenolic tackifier resins (favorably terpene-phenol resins) being more preferable.

Examples of the phenolic tackifier resins include terpene phenolic resins, hydrogenated terpene phenolic resins, alkylphenolic resins, and rosin phenolic resins.

The term "terpene phenolic resin" refers to a resin including a terpene residue and a phenol residue, and is inclusive of both a copolymer of a terpene and a phenol compound (terpene-phenol copolymer resin) and a phenol-modified homopolymer or copolymer of a terpene (phenol-modified terpene resin). Preferable examples of terpenes constituting such terpene phenolic resins include monoterpenes such as α-pinene, β-pinene, and limonene (including d-form, 1-form and d/1 form (dipentene)). The hydrogenated terpene phenolic resin has a structure obtained by hydrogenating such a terpene phenolic resin. Such a resin is sometimes referred to as a hydrogen-added terpene phenolic resin.

The alkylphenolic resin is a resin (oily phenolic resin) obtainable from an alkylphenol and formaldehyde. Examples of alkylphenol resins include novolac type and resole type resins.

A rosin phenolic resin is typically a phenol-modified product of rosins or various rosin derivatives (including rosin esters, unsaturated fatty acid-modified rosins, and unsaturated fatty acid-modified rosin esters) described later. Examples of the rosin phenolic resin include rosin phenolic resins obtained, for example, by a method of adding a phenol to a rosin or the rosin derivative with an acid catalyst and thermally polymerizing.

Examples of terpene-based tackifier resins include polymers of terpenes (typically monoterpenes) such as α-pinene, β-pinene, d-limonene, l-limonene, and dipentene. The polymer may be a homopolymer of one type of terpene or a copolymer of two or more types of terpenes. The homopolymers of one type of terpene can be exemplified by an α-pinene polymer, β-pinene polymer, and a dipentene polymer. The modified terpene resin is exemplified by modifications of the terpene resin. Specific examples include styrene-modified terpene resins and hydrogenated terpene resins.

The softening point of the tackifier resin is not particularly limited. From the standpoint of improving the cohesiveness, in some embodiments, a tackifier resin having a softening point (softening temperature) of about 80° C. or higher (preferably, about 100° C. or higher, e.g., above 105° C.) can be preferably used. The art disclosed herein can be preferably implemented in an embodiment in which more than 50% by weight (more preferably, more than 70% by weight, for example, more than 90% by weight) of the total amount of the tackifier resin (taken as 100% by weight) contained in the PSA layer is taken by a tackifier resin having the abovementioned softening point. For example, a phenolic tackifier resin (terpene phenolic resin or the like) having such a softening point can be advantageously used. The tackifier resin may include, for example, a terpene phenolic resin having a softening point of about 135° C. or higher (furthermore, about 140° C. or higher). The upper limit of the softening point of the tackifier resin is not particularly limited. From the standpoint of improving the adhesion to an adherend, in some embodiments, a tackifier resin having a softening point of about 200° C. or lower (more preferably about 150° C. or lower, e.g., below 130° C.) can be preferably used. The softening point of the tackifier resin can be measured based on a softening point test method (ring and ball method) prescribed in JIS K 2207.

In some preferable embodiments, the tackifier resin includes one or two or more phenolic tackifier resins (typically, a terpene phenolic resin). The art disclosed herein can be preferably implemented, for instance, in an embodiment where a terpene phenolic resin corresponds to about 25% by weight or more (more preferably, about 30% by weight or more) with the total amount of the tackifier resin being 100% by weight. About 50% by weight or more of the total amount of the tackifier resin may be a terpene phenolic resin, and about 80% by weight or more (e.g., about 90% by weight or more) may be a terpene phenolic resin. Substantially all of the tackifier resin (e.g., about 95% by weight to 100% by weight, even about 99% by weight to 100% by weight) may be a terpene phenolic resin.

While no particular limitations are imposed, in some embodiments, the tackifier resin may include a tackifier resin having a hydroxyl value higher than 20 mg KOH/g. Among such tackifier resins, a tackifier resin having a hydroxyl value of 30 mg KOH/g or more is preferable. Hereinafter, a tackifier resin having a hydroxyl value of 30 mg KOH/g or more may be referred to as a "high-hydroxyl-value resin". With the tackifier resin including such a high-hydroxyl-value resin, a PSA layer can be obtained that shows excellent adhesion to the adherend and high cohesive strength. In some embodiments, the tackifier resin may include a high-hydroxyl-value resin having a hydroxyl value of 50 mg KOH/g or higher (more preferably, 70 mg KOH/g or higher).

As the hydroxyl value, it is possible to use a value determined by the potentiometric titration method specified in JIS K0070:1992.

As the high-hydroxyl-value resin, a species having at least a prescribed hydroxyl value can be used among the various tackifier resins described earlier. The high-hydroxyl-value resins can be used singly as one species or in a combination of two or more species. For example, a phenolic tackifier resin having a hydroxyl value of 30 mgKOH/g or higher can be preferably used as the high-hydroxyl-value resin. In some preferable embodiments, a terpene phenolic resin having a hydroxyl value of 30 mgKOH/g or higher is used as the tackifier resin. The terpene phenolic resin is advantageous because the hydroxyl value can be controlled at will through the copolymerization ratio of phenol.

The maximum hydroxyl value of the high-hydroxyl-value resin is not particularly limited. From the standpoint of the compatibility with the base polymer and the like, the hydroxyl value of the high-hydroxyl-value resin is suitably about 200 mgKOH/g or lower, preferably about 180 mgKOH/g or lower, more preferably about 160 mgKOH/g or lower, and even more preferably about 140 mgKOH/g or lower. The art disclosed herein can be preferably implemented in an embodiment in which the tackifier resin includes a high-hydroxyl-value resin (e.g., a phenol-based tackifier resin, preferably a terpene phenolic resin) having a hydroxyl value of 30 mgKOHg to 160 mgKOH/g. In some embodiments, a high-hydroxyl-value resin having a hydroxyl value of 30 mgKOHg to 80 mgKOH/g (e.g., 30 mgKOHg to 65 mgKOH/g) can be preferably used. In other embodiments, a high-hydroxyl-value resin having a hydroxyl value of 70 mgKOHg to 140 mgKOH/g can be preferably used.

While no particular limitations are imposed, when a high-hydroxyl-value resin is used, the ratio of high-hydroxyl-value resin (e.g., a terpene phenolic resin) to the entire tackifier resin in the PSA layer can be, for example, about 25% by weight or higher, preferably about 30% by weight or higher, and more preferably about 50% by weight or higher (e.g., about 80% by weight or higher, typically about 90% by weight or higher). Substantially all of the tackifier resin (e.g., about 95% by weight to 100% by weight, more preferably about 99% by weight to 100% by weight) may be a high-hydroxyl-value resin.

When the PSA layer includes a tackifier resin, the amount of the tackifier resin used is not particularly limited, and may be suitably selected in a range of, for example, about 1 part to 100 parts by weight to 100 parts by weight of the base polymer. From the standpoint of favorably obtaining the effect to increase the peel strength, the amount of the tackifier resin used to 100 parts by weight of the base polymer (e.g., acrylic polymer) is suitably 5 parts by weight or greater, preferably 10 parts by weight or greater, or possibly 15 parts by weight or greater. From the standpoint of the impact resistance and cohesive strength, the amount of the tackifier resin used to 100 parts by weight of the base polymer (e.g., acrylic polymer) is suitably 50 parts by weight or less, possibly 40 parts by weight or less, or even 30 parts by weight or less.

(Crosslinking Agent)

In the art disclosed herein, the PSA composition used for forming the PSA layer may comprise a crosslinking agent as necessary. The type of crosslinking agent is not particularly limited and a suitable species can be selected and used among heretofore known crosslinking agents. Examples of the crosslinking agent include isocyanate-based crosslinking agents, epoxy-based crosslinking agents, oxazoline-based crosslinking agents, aziridine-based crosslinking agents, melamine-based crosslinking agents, peroxide-based crosslinking agents, urea-based crosslinking agents, metal alkoxide-based crosslinking agents, metal chelate-based crosslinking agents, metal salt-based crosslinking agents, carbodiimide-based crosslinking agents, hydrazine-based crosslinking agents, amine-based crosslinking agents, and silane coupling agents. Among them, isocyanate-based crosslinking agents, epoxy-based crosslinking agents, oxazoline-based crosslinking agents, aziridine-based crosslinking agents and melamine-based crosslinking agents are preferable; isocyanate-based crosslinking agents and epoxy-based crosslinking agents are more preferable; and isocyanate-based crosslinking agents are particularly preferable. The use of an isocyanate-based crosslinking agent tends to bring about impact resistance superior to other crosslinked matrices while obtaining the PSA layer's cohesive strength. For instance, it is also advantageous to use an isocyanate-based crosslinking agent in improving the adhesive strength to an adherend formed of polyester resin such as PET. For the crosslinking agent, solely one species or a combination of two or more species can be used.

As the isocyanate-based crosslinking agent, it is preferable to use a polyfunctional isocyanate (which refers to a compound having an average of two or more isocyanate groups per molecule, including a compound having an isocyanurate structure). For the isocyanate-based crosslinking agent, solely one species or a combination of two or more species can be used.

Examples of the polyfunctional isocyanate include aliphatic polyisocyanates, alicyclic polyisocyanates, and aromatic polyisocyanates.

Examples of an aliphatic polyisocyanate include 1,2-ethylene diisocyanate; tetramethylene diisocyanates such as 1,2-tetramethylene diisocyanate, 1,3-tetramethylene diisocyanate, 1,4-tetramethylene diisocyanate, etc.; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate, 2,5-hexamethylene diisocyanate, etc.; 2-methyl-1,5-pentane diisocyanate, 3-methyl-1,5-pentane diisocyanate, and lysine diisocyanate.

Examples of an alicyclic polyisocyanate include isophorone diisocyanate; cyclohexyl diisocyanates such as 1,2-cyclohexyl diisocyanate, 1,3-cyclohexyl diisocyanate, 1,4-cyclohexyl diisocyanate, etc.; cyclopentyl diisocyanates such as 1,2-cyclopentyl diisocyanate, 1,3-cyclopentyl diisocyanate etc.; hydrogenated xylylene diisocyanate, hydrogenated tolylene diisocyanate, hydrogenated diphenylmethane diisocyanate, hydrogenated tetramethylxylene diisocyanate, and 4,4'-dicyclohexylmethane diisocyanate.

Examples of an aromatic polyisocyanate include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate, and xylylene-1,3-diisocyanate.

A preferable example of the polyfunctional isocyanate has an average of three or more isocyanate groups per molecule. Such a tri-functional or higher polyfunctional isocyanate can be a multimer (typically a dimer or a trimer), a derivative (e.g., an adduct of a polyol and two or more polyfunctional isocyanate molecules), a polymer or the like of a di-functional, tri-functional, or higher polyfunctional isocyanate. Examples include polyfunctional isocyanates such as a dimer and a trimer of a diphenylmethane diisocyanate, an isocyanurate (a cyclic trimer) of a hexamethylene diisocyanate, a reaction product of trimethylol propane and a tolylene diisocyanate, a reaction product of trimethylol propane and a hexamethylene diisocyanate, polymethylene polyphenyl isocyanate, polyether polyisocyanate, and polyester polyisocyanate. Commercially available polyfunctional isocyanates include product name DURANATE TPA-100 available from Asahi Kasei Chemicals Corporation and product names CORONATE L, CORONATE HL, CORONATE HK, CORONATE HX, and CORONATE 2096 available from Tosoh Corporation.

The amount of isocyanate-based crosslinking agent used is not particularly limited. For example, it can be about 0.5 part by weight or greater to 100 parts by weight of the base polymer. From the standpoint of combining cohesive strength with tightness of adhesion and of the impact resistance and so on, the amount of isocyanate-based crosslinking agent used to 100 parts by weight of the base polymer may be, for example, 1.0 part by weight or greater, or preferably 1.5 parts by weight or greater (typically 2.0 parts by weight or greater, e.g., 2.5 parts by weight or greater).

From the standpoint of obtaining tighter adhesion to the adherend, the amount of the isocyanate-based crosslinking agent used is suitably 10 parts by weight or less, 8 parts by weight or less, or even 5 parts by weight or less (e.g., 3 parts by weight or less) to 100 parts by weight of the base polymer.

In some preferable embodiments, as the crosslinking agent, an isocyanate-based crosslinking agent is used in combination with at least one other species of crosslinking agent having a crosslinkable functional group different from that of the isocyanate-based crosslinking agent (or a "non-isocyanate-based crosslinking agent). According to the art disclosed herein, the combined use ofisocyanate-based crosslinking agent and non-isocyanate-based crosslinking agent can bring about excellent cohesive strength. The PSA layer in the art disclosed herein may include the crosslinking agent, for instance, in a crosslinked form, in a pre-crosslinked form, in a partially crosslinked form, in an intermediate or combined form of these. In typical, the crosslinking agent is included in the adhesive layer mostly in a crosslinked form.

There are no particular limitations to the type of non-isocyanate-based crosslinking agent that can be used in combination with the isocyanate-based crosslinking agent. A suitable species can be selected and used among the crosslinking agents described above. The non-isocyanate-based crosslinking agents can be used singly as one species or in a combination of two or more species.

In some preferable embodiments, an epoxy-based crosslinking agent can be used as the non-isocyanate-based crosslinking agent. For instance, with the combined use of isocyanate-based and epoxy-based crosslinking agents, cohesion is likely to be combined with impact resistance. As the epoxy-based crosslinking agent, a compound having two or more epoxy groups in a molecule can be used without particular limitation. An epoxy-based crosslinking agent having 3 to 5 epoxy groups in a molecule is preferable. Epoxy-based crosslinking agents can be used singly as one species or in a combination of two or more species.

Specific examples of the epoxy-based crosslinking agent include, but are not limited to, N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether. Examples of commercially available epoxy-based crosslinking agents include product names TETRAD-C and TETRAD-X both available from Mitsubishi Gas Chemical Co., Inc., product name EPICLON CR-5L available from DIC Corp., product name DENACOL EX-512 available from Nagase ChemteX Corporation, and product name TEPIC-G available from Nissan Chemical Industries, Ltd.

The amount of the epoxy-based crosslinking agent to be used is not particularly limited. The amount of the epoxy-based crosslinking agent to be used can be, for example, more than 0 part by weight and about 1 part by weight or less (typically about 0.001 part to 0.5 part by weight) to 100 parts by weight of the base polymer. From the standpoint of favorably obtaining the effect to increase the cohesive strength, the amount of epoxy-based crosslinking agent used is suitably about 0.002 part by weight or greater, preferably about 0.005 part by weight or greater, or more preferably about 0.008 part by weight or greater to 100 parts by weight of the base polymer. From the standpoint of obtaining tighter adhesion to an adherend, the amount of the epoxy-based crosslinking agent used is suitably about 0.2 part by weight or less, preferably about 0.1 part by weight or less, more preferably less than about 0.05 part by weight, or even more preferably less than about 0.03 part by weight (e.g., about 0.025 part by weight or less) to 100 parts by weight of the base polymer. With decreasing amount of epoxy-based crosslinking agent used, the impact resistance tends to improve.

In the art disclosed herein, the relative amounts of isocyanate-based crosslinking agent and non-isocyanate-based crosslinking agent (e.g., epoxy-based crosslinking agent) are not particularly limited. For instance, the amount of non-isocyanate-based crosslinking agent can be about $1/50$ or less of the amount of isocyanate-based crosslinking agent. From the standpoint of more favorably bringing about tight adhesion to the adherend and cohesive strength, the amount of non-isocyanate-based crosslinking agent is suitably about $1/75$ or less, or preferably about $1/100$ or less (e.g., $1/150$ or less) of the amount of isocyanate-based crosslinking agent by weight. From the standpoint of favorably obtaining the effect of the combined use of isocyanate-based crosslinking agent and non-isocyanate-based crosslinking agent (e.g., epoxy-based crosslinking agent), the amount of the non-isocyanate-based crosslinking agent is suitably about $1/1000$ or more, for example, about $1/500$ or more of the amount of isocyanate-based crosslinking agent.

The total use (total amount) of crosslinking agent is not particularly limited. For instance, it can be about 10 parts by weight or less to 100 parts by weight of the base polymer (favorably an acrylic polymer) or selected from a range of preferably about 0.005 part to 10 parts by weight, or more preferably about 0.01 part to 5 parts by weight.

(Rust Inhibitor)

The PSA layer according to some preferable embodiments may include a rust inhibitor. The rust inhibitor is not particularly limited. Examples include azole-based rust inhibitors, amine compounds, nitrites, ammonium benzoate, ammonium phthalate, ammonium stearate, ammonium palmitate, ammonium oleate, ammonium carbonate, salts of dicyclohexylaminebenzoic acid, urea, urotropin, thiourea, phenyl carbamate, and cyclohexylammonium-N-cyclohexyl carbamate (CHC). For the rust inhibitor, solely one species or a combination of two or more species can be used.

As the rust inhibitor, an azole-based rust inhibitor can be preferably used. A preferable azole-based rust inhibitor comprises an azole-based compound (a five-membered cyclic aromatic compound having two or more hetero atoms with at least one of which being a nitrogen atom) as an active ingredient. Preferable examples of compounds that can be used as the azole-based rust inhibitor include a benzotriazole-based rust inhibitor comprising a benzotriazole compound as an active ingredient. Favorable examples of the benzotriazole-based compound include 1,2,3-benzotriazole, 5-methylbenzotriazole, 4-methylbenzotriazole, and carboxybenzotriazole.

The rust inhibitor content is not particularly limited, and can be, for example, 0.01 part by weight or greater (typically 0.05 parts by weight or greater) to 100 parts by weight of the base polymer. From the standpoint of obtaining greater inhibition of metal corrosion, the amount may be 0.1 part by weight or greater, 0.3 part by weight or greater, or 0.5 part by weight or greater. From the standpoint of increasing the cohesive strength of the PSA, the amount of rust inhibitor is suitably less than 8 parts by weight, possibly 5 parts by weight or less, or even 2 parts by weight or less to 100 parts by weight of the base polymer.

(Other Additives)

The PSA composition may include, as necessary, various additives which are common in the field of PSA compositions, such as a leveling agent, crosslinking aid, plasticizer, softener, antistatic agent, aging-preventing agent, UV absorber, antioxidant, and light stabilizer. As for these various additives, heretofore known species can be used by conventional methods, and the present invention is not particularly characterized thereby. Therefore, detailed description is omitted.

(Psa Composition)

The PSA layer disclosed herein can be formed from an aqueous PSA composition, solvent-based PSA composition, hot-melt PSA composition, or active energy ray-curable PSA composition which cures upon irradiation of active energy rays such as UV rays and electron beam. The aqueous PSA composition refers to a PSA composition that comprises a PSA (PSA layer-forming components) in a solvent whose primary component is water (an aqueous solvent), typically including a so-called water-dispersed PSA composition (in which the PSA is at least partially dispersed in water). Further, the solvent-based PSA composition refers to a PSA composition that comprises a PSA in an organic solvent. As the organic solvent in the solvent-based PSA composition, among the examples (toluene, ethyl acetate, etc.) of the organic solvent possibly used in the solution polymerization, one, two or more species can be used without particular limitations. From the standpoint of adhesive properties and the like, the art disclosed herein can be preferably implemented in an embodiment in which the PSA layer is formed from a solvent-based PSA composition. In an embodiment having a solvent-based PSA layer formed from a solvent-based PSA composition, the effect of the art disclosed herein to increase the refractive index can be preferably obtained.

Based on the above, this Description provides a PSA composition comprising one, two or more species of components possibly included in the PSA layer disclosed herein. By using the PSA composition, it is possible to form a PSA layer having a light transmittance up to 30% and a light reflectance of 8% or higher. The PSA composition comprises at least two species of colorants. In addition, it may include components (typically, base polymer) allowed to be included in the PSA layer described above. In the PSA composition, the amount (% by weight) of each component possibly in the PSA layer corresponds to the amount (% by weight) based on the solid content (or by non-volatiles). With respect to other specifics of the PSA composition are as described about the PSA layer and thus redundant details are omitted.

(Formation of PSA Layer)

The PSA layer disclosed herein can be formed by a conventionally known method. For instance, it is possible to use a method where a PSA composition is applied to a releasable surface (release face) and allowed to dry to form a PSA layer. For example, in an embodiment of the PSA sheet having a support substrate, a direct method can be used where the PSA composition is directly provided (typically applied) to the support substrate and allowed to dry to form a PSA layer. Alternatively, a transfer method can be employed where the PSA composition is provided to a releasable surface (e.g., a release face) and allowed to dry to form a PSA layer on the surface and the PSA layer is transferred to a support substrate. As the release face, the surface of a release liner described later can be preferably used. The PSA layer disclosed herein is typically formed in a continuous form, but not limited to such a form. For instance, the PSA layer may be formed in a regular or random pattern of dots, stripes, etc.

The PSA composition can be applied with a heretofore known coater, for instance, a gravure roll coater, die coater, and bar coater. Alternatively, the PSA composition can be applied by immersion, curtain coating, etc.

From the standpoints of accelerating the crosslinking reaction, improving production efficiency, and the like, it is preferable to dry the PSA composition under heating. The drying temperature can be, for example, about 40° C. to 150° C., and preferably about 60° C. to 130° C. After dried, the PSA composition can be subjected to aging to adjust the distribution or migration of components within the PSA layer, to allow the crosslinking reaction to proceed, to reduce possible distortion in the PSA layer, and so on.

The PSA layer disclosed herein may have a monolayer structure or a multilayer structure with two or more layers. From the standpoint of the productivity, etc., the PSA layer preferably has a monolayer structure.

The thickness of the PSA layer is not particularly limited. From the standpoint of preventing the PSA sheet from becoming excessively thick, the thickness of the PSA layer is suitably about 100 µm or less, preferably about 70 µm or less, and more preferably about 50 µm or less. The PSA layer thickness can be about 35 µm or less, for instance, about 25 µm or less, even about 15 µm or less. The PSA layer with a limited thickness may well accommodate needs for thinning and weight saving. The minimum thickness of the PSA layer is not particularly limited. From the standpoint of the tightness of adhesion to an adherend, it is advantageously about 1 µm or greater, suitably about 3 µm or greater, preferably about 10 µm or greater, more preferably about 15 µm or greater, more preferably about 20 µm or greater, possibly about 30 µm or greater, about 35 µm or greater, or even about 40 µm or greater. Having at least a certain thickness, it can preferably obtain a light transmittance up to the prescribed value and a reflectivity of at least the prescribed value. Desirable adhesive properties (bonding strength, impact resistance, etc.) are also likely to be obtained.

<Support Substrate>

In an embodiment of the PSA sheet disclosed herein as an adhesively single-faced or double-faced substrate-supported PSA sheet, as the substrate supporting (backing) the PSA layer(s), it is possible to use a resin film, paper, cloth, rubber sheet, foam sheet, metal foil, composite of these, etc. Examples of the resin film include polyolefinic film such as polyethylene (PE), polypropylene (PP), and an ethylene-propylene copolymer; polyester film such as polyethylene terephthalate (PET); vinyl chloride resin film; vinyl acetate resin film; polyimide resin film; polyamide resin film; fluororesin film; and cellophane. Examples of the paper include Washi paper, kraft paper, glassine paper, high-grade paper, synthetic paper and top-coated paper. Examples of the cloth include woven fabrics and non-woven fabrics formed of one species or a blend of various fibrous substances. Examples of the fibrous substances include cotton, staple fiber, Manila hemp, pulp, rayon, acetate fiber, polyester fiber, polyvinyl alcohol fiber, polyamide fiber and polyolefin fiber. Examples of the rubber sheet include a natural rubber sheet and a butyl rubber sheet. Examples of the foam sheet include a polyurethane foam sheet and a polychloroprene rubber foam sheet. Examples of the metal foil include aluminum foil and copper foil.

The concept of nonwoven fabric here primarily refers to non-woven fabric for PSA sheets used in the field of PSA tape and other PSA sheets, typically referring to nonwoven fabric (or so-called "paper") fabricated using a general paper machine. As used herein, the resin film typically refers to a non-porous resin sheet. The concept thereof is distinguished from, for instance, nonwoven fabrics (i.e., it excludes nonwoven fabrics). The resin film can be an unstretched film, uniaxially-stretched film or biaxially-stretched film.

As the support substrate forming the substrate-supported PSA sheet, it is preferable to use a substrate comprising a resin film as the base film. The base film is typically a component capable of maintaining the shape by itself (a self-standing member). The support substrate in the art disclosed herein may be essentially formed of such a base film. Alternatively, the support substrate may include a supplemental layer in addition to the base film. Examples of the supplemental layer include a colored layer, a reflective layer, a primer layer and an anti-static layer formed on the surface of the base film.

The resin film comprises a resin material as the primary component (a component accounting for more than 50% by weight of the resin film). Examples of the resin film include polyolefinic resin film such as polyethylene (PE), polypropylene (PP), and ethylene-propylene copolymer; polyester-based resin film such as polyethylene terephthalate (PET), polybutylene terephthalate (PBT), and polyethylene naphthalate (PEN); vinyl chloride-based resin film; vinyl acetate-based resin film; polyimide-based resin film; polyamide-based resin film; fluororesin film; and cellophane. The resin film can also be a rubber-based film such as natural rubber film and butyl rubber film. In particular, from the standpoint of the handling properties and the ease of processing, polyester films are preferable and among them PET film is particularly preferable. As used herein, the "resin film" typically refers to a non-porous sheet and should be conceptually distinguished from so-called non-woven and woven fabrics (i.e., the concept excludes non-woven and woven fabrics).

The support substrate may be transparent or may have light-blocking or light-dimming properties. In some embodiments, the support substrate (e.g., resin film) can include a colorant. This allows adjustment to the light transmission (light-blocking properties) of the support substrate. Adjusting the support substrate's light transmission (e.g., vertical light transmittance) may help adjust the light transmission of the support substrate and further the light transmission of a PSA sheet comprising the substrate.

As the colorant, similar to the colorant that can be included in the PSA layer, various pigments and dyes can be used. The colorant is not particularly limited in color. The colorant can be, for instance, black, gray, white, red, blue, yellow, green, yellow-green, orange, purple, gold, silver and pearl.

In some embodiments, as the support substrate colorant, a black colorant can be preferably used for its ability to efficiently adjust the light-blocking properties (e.g., vertical light transmittance) in a small amount. Specific black colorants include the examples of the colorant possibly included in the PSA layer. In some preferable embodiments, it is possible to use a pigment (e.g., a particulate black colorant such as carbon black) having a mean particle diameter of 10 nm to 500 nm, or more preferably 10 nm to 120 nm.

The amount of colorant used in the support substrate (e.g., resin film) is not particularly limited. It can be used in an amount suitably adjusted to provide desirable optical properties. The amount of colorant used is suitably about 0.1% to 30% of the weight of the support substrate. For instance, it can be 0.1% to 25% (typically 0.1% to 20%) by weight.

To the support substrate (e.g., resin film), various additives can be added as necessary, such as fillers (inorganic and organic fillers, etc.), dispersing agent (surfactant, etc.), anti-aging agent, antioxidant, UV absorber, anti-static agent, slip agent and plasticizer. These various additives are added in amounts equivalent to about less than 30% by weight (e.g., less than 20% by weight, typically less than 10% by weight).

The support substrate (e.g., resin film) may have a monolayer structure or a multilayer structure with two, three or more layers. From the standpoint of the shape stability, the support substrate preferably has a monolayer structure. In case of a multilayer structure, at least one layer (preferably each layer) preferably has a continuous structure formed of the resin (e.g., a polyester-based resin). The method for producing the support substrate (typically a resin film) is not particularly limited and a heretofore known method can be suitably employed. For instance, heretofore known general film-forming methods can be suitably employed, such as extrusion, inflation molding, T-die casting, and calendar rolling.

The support substrate can be colored with a colored layer placed on the surface of the base film (preferably a resin film). In the support substrate in such an embodiment including the base film and colored layer, the base film may or may not include a colorant. The colored layer can be placed on one or each face of the base film. In an embodiment having a colored layer on each face of the base film, the respective colored layers may be the same or different in constitution.

Such a colored layer can be typically formed by applying a colored layer-forming composition to a base film, the composition comprising a colorant and a binder. As the colorant, heretofore known pigments and dyes can be used, similar to the colorants that can be included in the PSA layer and resin film. As the binder, materials known in the paint or printing field can be used without particular limitations. Examples include polyurethane, phenol resin, epoxy resin, urea-melamine resin and polymethyl methacrylate. The colored layer-forming composition can be, for instance, a solvent-based type, UV-curable type, heat-curable type, etc. The colored layer can be formed by a conventional colored layer-forming method without particular limitations. For instance, it is preferable to use a method where the colored layer (printed layer) is formed by gravure printing, flexographic printing, offset printing, etc.

The colored layer may have a monolayer structure formed entirely of a single layer or a multilayer structure including two, three or more colored sublayers. For instance, a colored layer having a multilayer structure with two or more colored sublayers can be formed by repeated applications (e.g., printing) of a colored layer-forming composition. The respective colored sublayers may be the same or different in color and amount of colorant. In a colored layer to provide light-blocking properties, from the standpoint of preventing formation of pinholes to increase the reliability of light leakage prevention, a multilayer structure is particularly significant.

The colored layer has a total thickness of suitably about 1 μm to 10 μm, preferably about 1 μm to 7 μm, or possibly, for instance, about 1 μm to 5 μm. In the colored layer including two or more colored sublayers, each sublayer preferably has a thickness of about 1 μm to 2 μm.

The support substrate's thickness is not particularly limited. From the standpoint of avoiding too thick a PSA sheet, the support substrate's thickness can be, for instance, about 200 μm or less (e.g., about 100 μm or less). In accordance with the purpose and application of the PSA sheet, the support substrate may have a thickness of about 70 μm or less, about 30 μm or less, or even about 15 μm or less (e.g., about 8 μm or less). The minimum thickness of the support substrate is not particularly limited. From the standpoints of the handling properties and ease of processing of the PSA sheet, the support substrate has a thickness of suitably about 2 µm or greater, preferably about 5 µm or greater, for instance, about 10 µm or greater.

The surface of the support substrate may be subjected to heretofore known surface treatments such as corona discharge treatment, plasma treatment, UV irradiation, acid treatment, base treatment, and primer coating. Such a surface treatment may increase the tightness of adhesion between the support substrate and the PSA layer. In other words, it may improve the anchoring of the PSA layer to the support substrate.

When the art disclosed herein is made as a substrate-supported adhesively single-faced PSA sheet, the backside of the support substrate may be subjected to a release treatment as necessary. In the release treatment, for instance, a general silicone-based, long-chain alkyl-based or fluorine-based release agent is applied typically in a thin layer measuring about 0.01 µm to 1 µm (e.g., 0.01 µm to 0.1 µm). Such a release treatment can be provided to bring about easier unwinding of a roll formed by winding the PSA sheet and other effects.

<Release Liner>

In the art disclosed herein, a release liner can be used in formation of the PSA layer, preparation of the PSA sheet, storage, distribution and processing of the unused PSA sheet, etc. The release liner is not particularly limited, and examples thereof include a release liner having a release layer on the surface of a liner substrate such as a resin film or paper, and a release liner made of a low-adhesive material such as a fluoropolymer (polytetrafluoroethylene, etc.) or a polyolefin resin (polyethylene, polypropylene, etc.). The release layer can be formed, for example, by subjecting the liner substrate to surface treatment with a release agent such as a silicone-based, long-chain alkyl-based, fluorine-based agent kind, or molybdenum sulfide.

<PSA Sheet Properties, Etc.>

(Adhesive Strength)

The 180° peel strength (adhesive strength) of the PSA sheet disclosed herein may vary depending on the purpose and application area and thus is not limited to a specific range. From the standpoint of obtaining good adhesion to adherends, the PSA sheet has an adhesive strength of suitably about 1.0 N/25 mm or greater, preferably about 5.0 N/25 mm or greater, more preferably about 10 N/25 mm or greater, or possibly even about 15 N/25 mm or greater. The art disclosed herein can bring about such an adhesive strength while the PSA layer comprises at least two species of colorants and has a light transmittance up to the prescribed value and a light reflectance of at least the prescribed value. The maximum adhesive strength is not particularly limited. It can be about 30 N/25 mm or less (e.g., 25 N/25 mm or less). The adhesive strength can be determined by the method described later in Examples. In case of a double-faced PSA sheet having an adhesive face on each side, the adhesive strength values on the respective faces can be the same or different.

(Shear Bonding Strength)

While no particular limitations are imposed, the PSA sheet disclosed herein preferably shows, for instance, a shear bonding strength of 1.0 MPa or greater. The PSA sheet showing such a shear bonding strength shows high resistance to a force acting to cause sliding of the bonding interface (i.e., a shear force), thereby having excellent adherend-holding properties. From the standpoint of obtaining superior holding properties, the shear bonding strength of the PSA sheet is preferably 1.8 MPa or greater, more preferably 2.0 MPa or greater, or yet more preferably 2.2 MPa or greater. The maximum shear bonding strength is not particularly limited. In general, the higher the more preferable. On the other hand, from the standpoint of facilitating obtaining a light transmittance up to the prescribed value and a light reflectance of at least the prescribed value, in some embodiments, the shear bonding strength can be, for instance, 20 MPa or less, 10 MPa or less, 5 MPa or less, or even 3 MPa or less. The shear bonding strength can be determined by the method described later in Examples.

(Light Transmittance)

While no particular limitations are imposed, the PSA sheet preferably has a light transmittance of 30% or lower. Such a PSA sheet may have light-blocking properties suited for light leakage prevention. It is also suited for adherend concealment and adherend appearance adjustment (e.g., reduction of uneven appearance) through PSA sheet and can provide designability. The PSA sheet has a light transmittance of preferably 28% or lower, more preferably 25% or lower, yet more preferably 20% or lower, or possibly even 18% or lower. In some preferable embodiments, the PSA sheet's light transmittance is below 12%, possibly below 10%, below 8.0%, below 6.0%, below 4.0%, or even below 3.0%. With decreasing light transmittance, it can exhibit superior light-blocking properties and concealing properties. The minimum light transmittance is not particularly limited. It can be essentially 0%, that is, at or below detection limit. It can also be 0.05% or higher, 0.1% or higher, 1.0% or higher, 2.0% or higher, or even 5.0% or higher. In some embodiments, the PSA sheet has a light transmittance of 8.0% or higher, or possibly 12% or higher (e.g., 15% or higher). A certain level of light transmittance enables suitable adherend concealment, appearance adjustment of adherend (e.g., a metal material) and providing design features while retaining the adherend texture. The PSA sheet with suitable light transmission is preferable also from the standpoint of maintaining adhesive properties, the efficiency of manufacturing, etc.

The light transmittance of the PSA sheet can be determined by the method described later in Examples. The light transmittance of the PSA sheet can be adjusted through PSA components (e.g., species of colorant (favorably of black colorant) and the amount thereof), substrate components, respective layer thicknesses, etc.

(Light Reflectance)

The PSA sheet preferably has a light reflectance of 8.0% or higher. In addition to limiting the PSA layer's light transmittance, by having a light reflectance of 8% or higher on the PSA sheet surface to reflect light on the particular adhesive face and reduce the PSA-entering light, it is possible to combine light-blocking or light-dimming properties with high-precision optical control. The PSA sheet has a light reflectance of preferably 9.0% or higher, more preferably 10% or higher, yet more preferably 12% or higher, or possibly even 14% or higher (e.g., 16% or higher). The maximum light reflectance is set in a suitable range in relation to the light transmittance and thus is not limited to a specific range. It is, for instance, below 40%, possibly 30% or lower, or even 20% or lower (e.g., 15% or lower).

The light reflectance of the PSA sheet can be determined by the method described later in Examples. The light reflectance of the PSA sheet can be adjusted through PSA components (e.g., species of colorant (favorably of metal oxide) and the amount thereof), substrate components, etc.

In case of a double-faced PSA sheet having an adhesive face on each side, the respective faces (respective adhesive faces; the first and second adhesive faces) may have the same or different light reflectances.

The PSA sheet is not particularly limited in the relationship between light transmittance and light reflectance. For instance, the PSA sheet's ratio (R/T) of light reflectance R to light transmittance T is suitably 0.4 or higher, preferably 0.5 or higher, more preferably 1.0 or higher, yet more preferably 2.0 or higher, or particularly preferably 4.0 or higher (e.g., 4.5 or higher). The maximum R/T ratio value is about 10 or lower, for instance, possibly 5 or lower. In an embodiment requiring the PSA sheet to have a certain level of light transmission, the R/T ratio value can be below 3, below 2, or even below 1.

(Total Thickness)

The total thickness of the PSA sheet disclosed herein (including PSA layer(s) and a support substrate if any, but not a release liner) is not particularly limited. The total thickness of the PSA sheet can be, for example, about 300 μm or less. From the standpoint of thickness reduction, it is suitably about 200 μm or less, or possibly even about 100 μm or less (e.g., about 70 μm or less). In some preferable embodiments, the PSA sheet thickness can be about 50 μm or less, or even, for instance, about 35 μm or less. Although the minimum thickness of the PSA sheet is not particularly limited, it is possibly about 1 μm or greater, for instance, suitably about 3 μm or greater, preferably about 6 μm or greater, more preferably about 10 μm or greater (e.g., about 15 μm or greater), or yet more preferably about 20 μm or greater. The PSA sheet having at least a certain thickness is easily handled and tends to provide superior adhesion and impact resistance. It is noted that in a substrate-free PSA sheet, the PSA layer's thickness is the total thickness of the PSA sheet.

<Applications>

The PSA sheet disclosed herein is suitable for various applications requiring light-blocking or light-dimming properties. For instance, some electronics such as portable electronic devices include luminous components for image displays, etc.; and therefore, to prevent the sort of light leakage, limited light transmission (e.g., light-blocking properties) may be needed in the PSA sheet. It may also be necessary to use the PSA sheet for member concealment, appearance adjustment, etc. With respect to such electronics, the PSA sheet disclosed herein is favorable.

Non-limiting examples of the portable electronic device include cell phones, smartphones, tablet PCs, notebook PCs, various wearable devices (e.g., wrist wears put on wrists such as wrist watches; modular devices attached to bodies with a clip, strap, etc.; eye wears including glass-shaped wears (monoscopic or stereoscopic, including head-mounted pieces); clothing types worn as, for instance, accessories on shirts, socks, hats/caps, etc.; ear wears such as earphones put on ears; etc.), digital cameras, digital video cameras, acoustic equipment (portable music players, IC recorders, etc.), calculators (e.g., pocket calculators), hand-held game devices, electronic dictionaries, electronic notebooks, electronic books, vehicle navigation devices, portable radios, portable TVs, portable printers, portable scanners, and portable modems. As used herein, being "portable" means not just providing simple mobility, but further providing a level of portability that allows an individual (average adult) to carry it relatively easily. Examples of the electronics include PCs (desktops, notebooks, tablets, etc.) and televisions. These may include liquid crystal, organic EL and other display devices.

Among these portable electronic devices, in a portable electronic device having a pressure sensor, the PSA sheet disclosed herein can be used for fixing the pressure sensor and other components. In some embodiments, the PSA sheet can be used for fixing a pressure sensor and other components in an electronic device (typically, a portable electronic device) equipped with a function to identify an absolute position on a panel corresponding to a screen (typically, a touch panel) with a device to specify the position on the screen (typically, a pen type or a mouse type device) and a device to detect the position.

The PSA sheet disclosed herein is suitable for an application in which it is placed on the back of a display (screen) such as a touch panel display in a portable electronic device. Placement of the PSA sheet disclosed herein on the back of the display (screen) can prevent degradation of display visibility regardless of how the portable electronic device is used.

The PSA sheet disclosed herein is suitable for a portable electronic device comprising an optical sensor. Various devices such as the aforementioned sort of portable electronic devices may have optical sensors using light such as IR light, visible light and UV light for purposes including device operation, nearby object detection, detection of the surrounding brightness (ambient light) and data communication. While no particular limitations are imposed, examples of the light sensor include an accelerometer, proximity sensor and brightness sensor (ambient light sensor). Such optical sensors have photodetector elements for light such as UV light, visible light and IR light and may also have emitters for specific light such as IR light. In other words, the optical sensor may include an emitter and/or a photodetector element for light in a specific wavelength range in the wavelength spectrum including UV light, visible light and IR light. The art disclosed herein can be applied to such a device to limit the entry of light that may get refracted and diffused in the PSA layer, thereby enabling optical control inside the device to prevent deterioration of sensor accuracy.

Examples of the material (adherend material) to which the PSA sheet disclosed herein is applied include, but are not limited to, metals such as copper, silver, gold, iron, tin, palladium, aluminum, nickel, titanium, chromium, zinc and an alloy of two or more species among these; various resin materials (typically, plastic materials) such as polyimide resin, acrylic resin, polyether nitrile resin, polyether sulfone resin, polyester resin (PET resin, polyethylene naphthalate resin, etc.), polyvinyl chloride resin, polyphenylene sulfide resin, polyether ether ketone resin, polyamide resin (so-called aramid resin, etc.), polyarylate resin, polycarbonate resin, and liquid crystal polymer; inorganic materials such as alumina, zirconia, soda glass, silica glass and carbon. Among them, metals such as copper, aluminum, and stainless steel, and resin materials (typically plastic materials) such as polyester resin (PET resin, etc.), polyimide resin, aramid resin and polyphenylene sulfide resin are widely used. The material may constitute a member of a product such as an electronic device. The PSA sheet disclosed herein can be applied to a member formed from the material. The material may constitute an article to be fixed (e.g., a backside member such as an electromagnetic wave shield and a reinforcing sheet) in the pressure sensor, screen, etc. The article to be fixed refers to the target object to which the PSA sheet is applied, that is, the adherend. For instance, in a portable electronic device, the backside member refers to a member placed on the opposite side to the front face (visible side) of the pressure sensor or screen. For instance, it can be a member constituting a support 240 placed on the backside of display device 200 shown in FIG. 3 described later. The article to be fixed may have a single layer structure or a multilayer structure, and its surface (face to be attached) to which the PSA sheet is applied may be subjected to various types of surface treatment. The article to be fixed is not particularly limited. One example is a backside component having a thickness of about 1 µm or greater (typically, 5 µm or greater, for example, 60 µm or greater, and also 120 µm or greater) and about 1500 µm or less (e.g., 800 µm or less), but these values are not particularly limiting.

The member or material as an application target for the PSA sheet disclosed herein (at least one adherend for a double-faced PSA sheet) may have optical transparency. As for such an optically transparent adherend, for instance, the sensor light passes through the adherend and reaches the PSA sheet. Thus, it is likely able to benefit from the effect of the art disclosed herein (reduction of light refraction and diffusion within the PSA layer by means of light reflectivity). The adherend has a light transmittance of, for instance, higher than 50%, or possibly 70% or higher. In some preferable embodiments, the adherend's light transmittance is 80% or higher, more preferably 90% or higher, or possibly 95% or higher (e.g., 95% to 100%). Such materials can be resin films (e.g., polyester-based resin films such as PET film) placed on backsides of image displays in various devices such as portable electronic devices. The PSA sheet disclosed herein can be preferably used when applied to such an adherend (e.g., a member) having a prescribed or higher light transmittance. The light transmittance can be determined by the same method as for the light transmittance of the PSA layer.

Based on the above, the art disclosed herein provides a laminate having a PSA sheet and a member to which the PSA sheet is adhered. In some embodiments, the PSA sheet-containing laminate has the PSA sheet and a metal member (first member). In some embodiments, the member to which the PSA sheet is adhered may have an aforementioned adherend material light transmittance. In this embodiment, the PSA sheet-containing laminate has the PSA sheet and an optically transparent member (second member). In some preferable embodiments, the laminate has a metal member (first member), a PSA sheet and an optically transparent member (second member) in this order. The PSA sheet may also be referred to as a PSA layer in the laminate.

Figure 2:
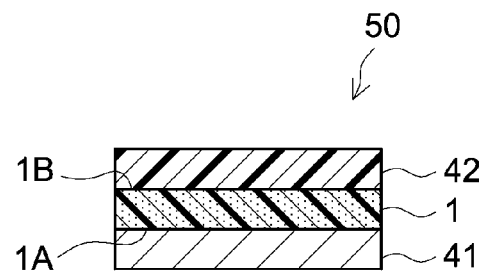
FIG. 2 shows a cross-sectional diagram schematically illustrating a structural example of the laminate.

FIG. 2 shows a constitutional example of the laminate. Laminate 50 shown in FIG. 2 has a first member 41, a substrate-free PSA sheet 1, and a second member 42 in this order. In particular, in laminate 50, PSA sheet 1 without substrate has one (first) adhesive face 1A bonded to first member 41 and another (second) adhesive face 1B bonded to second member 42. In this embodiment, both first and second members 41 and 42 have sheet forms or plate forms, and laminate 50 has a multilayer structure. The details of the members constituting the laminate are as described above, regarded as the aforementioned members, materials and adherends. Thus, redundant details are not repeated.

In some preferable embodiments, first member 41 is a metal member and a metal material is used among the aforementioned examples of adherend materials. The metal member as first member 41 is preferably an aluminum member or a stainless steel member, or more preferably a stainless steel member. PSA sheet 1 disclosed herein can be applied to a metal member as first member 41 to appropriately conceal the metal member. Such a metal member can be, for instance, a member constituting a support 240 of a display device 200 shown in FIG. 3 described later. In some preferable embodiments, second member 42 is an optically transparent member and has a light transmittance that the aforementioned optically transparent adherend would have. Second member 42 is formed of preferably a resin film, or more preferably a polyester-based resin film (more specifically, a PET-based resin film). For instance, second member 42 can be placed on the backside of a display in a display device. In an embodiment where PSA sheet 1 is applied to an optically transparent member as second member 42, the adhesive face can reflect the light entering through the optically transparent member to reduce the amount of light entering the PSA layer. In typical, laminate 50 as described above can be a component of an organic EL display device, liquid crystal display device, etc. For instance, laminate 50 is favorable for placement on backsides of image displays of various devices such as portable electronic devices (possibly, displays of touch panel displays, etc.).

The PSA sheet disclosed herein is limited in light transmission and a preferable embodiment thereof can have excellent light-blocking properties; and therefore, it is preferably used in electronic devices that include various light sources such as LED (light-emitting diodes) and luminous components such as self-luminous organic EL. For instance, it can be preferably used in an electronic device (typically a portable electronic device) having an organic EL display device or liquid crystal display device that requires certain optical properties.

Figure 3:
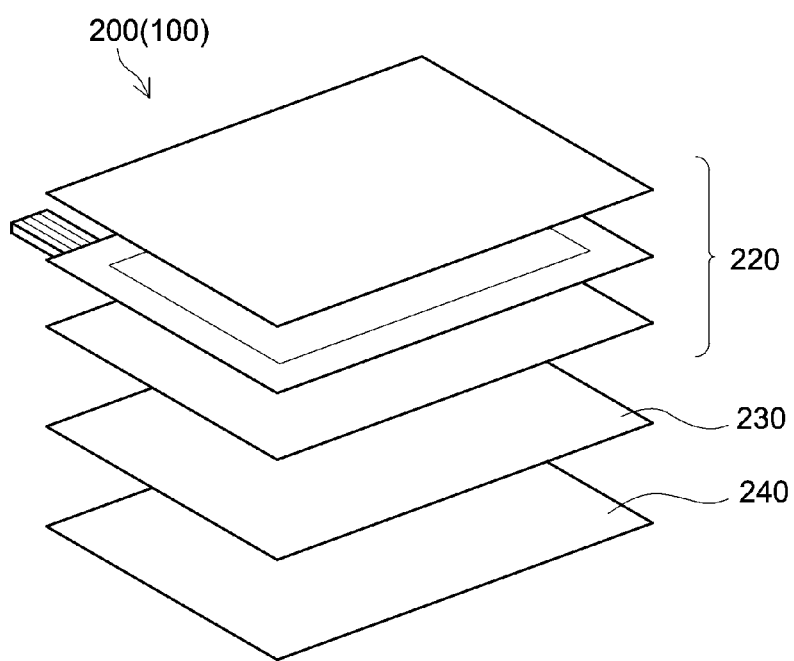
FIG. 3 shows an exploded perspective view schematically illustrating a constitutional example of the display device.

FIG. 3 shows an exploded perspective view schematically illustrating a constitutional example of the display device. As shown in FIG. 3, a display device 200 included in a portable electronic device 100 comprises a support 240 and a display 220 formed of a cover member, an organic EL unit, etc. Display device 200 further comprises a PSA sheet 230. In this constitutional example, PSA sheet 230 is in a form of adhesively double-faced PSA sheet (double-faced PSA sheet) fastening a member that constitutes display 220 and support 240. It is noted that support 240 typically includes a substrate (a metal plate such as a stainless steel plate, aluminum plate, etc.) or the like. The PSA sheet disclosed herein is preferably used as a component of a display device as described above.

The matters disclosed by this description include the following:

(1) A display device that comprises a display comprising a cover member and an organic EL unit, and a support, wherein
a PSA sheet is attached to the support,
the PSA sheet has a PSA layer comprising at least two species of colorants, and
the PSA layer has a light transmittance of 30% or lower and a light reflectance of 8% or higher.

(2) The display device according to (1) above, comprising an optical sensor that comprises an emitter and/or a photodetector element for light in a specific wavelength range in the wavelength spectrum including UV light, visible light and IR light.

(3) The display device according to (1) or (2) above, wherein the colorant content in the PSA layer is 1% by weight or higher and 10% by weight or lower.

(4) The display device according to any of (1) to (3) above, wherein the PSA layer comprises a black colorant as the first colorant and a metal oxide as the second colorant.

(5) The display device according to (4) above, wherein the metal oxide content in the PSA layer is 1% by weight or higher and 6% by weight or lower.

(6) The display device according to (4) or (5) above, wherein the black colorant content in the PSA layer is below 2% by weight.

(7) The display device according to any of (4) to (6) above, wherein the first colorant contained in an amount C1 and the second colorant contained in an amount C2 satisfy a ratio (C1/C2) by weight in the range between 0.01 and 0.30.

(8) The display device according to any of (1) to (7) above, wherein the PSA layer is an acrylic PSA layer comprising an acrylic polymer as a base polymer.

(9) The display device according to any of (1) to (8) above, wherein the PSA layer has a thickness in the range between 10 μm and 50 μm.

(10) The display device according to any of (1) to (9) above, wherein the PSA sheet is a substrate-free adhesively double-faced PSA sheet formed of the PSA layer.

(11) A PSA sheet that has a PSA layer comprising at least two species of colorants, wherein the PSA layer has a light transmittance of 30% or lower and a light reflectance of 8% or higher.

(12) The PSA sheet according to (11) above, wherein the colorant content in the PSA layer is 1% by weight or higher and 10% by weight or lower.

(13) The PSA sheet according to (11) or (12) above, wherein the PSA layer comprises a black colorant as the first colorant and a metal oxide as the second colorant.

(14) The PSA sheet according to (13) above, wherein the metal oxide content in the PSA layer is 1% by weight or higher and 6% by weight or lower.

(15) The PSA sheet according to (13) or (14) above, wherein the black colorant content in the PSA layer is below 2% by weight.

(16) The PSA sheet according to any of (13) to (15) above, wherein the first colorant contained in an amount C1 and the second colorant contained in an amount C2 satisfy a ratio (C1/C2) by weight in the range between 0.01 and 0.30.

(17) The PSA sheet according to any of (11) to (16) above, wherein the PSA layer is an acrylic PSA layer comprising an acrylic polymer as a base polymer.

(18) The PSA sheet according to any of (11) to (17) above, wherein the PSA layer has a thickness in the range between 10 μm and 50 μm.

(19) The PSA sheet according to any of (11) to (18) above, that is a substrate-free adhesively double-faced PSA sheet formed of the PSA layer.

(20) The PSA sheet according to any of (11) to (19) above, in use of joining a member in a portable electronic device.

(21) A laminate having a metal member (a first member) and a PSA sheet, wherein
the PSA sheet has a PSA layer comprising at least two species of colorants, and
the PSA layer has a light transmittance of 30% or lower and a light reflectance of 8% or higher.

(22) A laminate having an optically transparent member (a second member) and a PSA sheet, wherein
the PSA sheet has a PSA layer comprising at least two species of colorants, and
the PSA layer has a light transmittance of 30% or lower and a light reflectance of 8% or higher.

(23) A laminate having a metal member (first member), a PSA sheet and an optically transparent member (second member) in this order, wherein
the PSA sheet has a PSA layer comprising at least two species of colorants, and
the PSA layer has a light transmittance of 30% or lower and a light reflectance of 8% or higher.

(24) The laminate according to (21) or (23) above, wherein the metal member is an aluminum member or a stainless steel member.

(25) The laminate according to (22) or (23) above, wherein the optically transparent member has a light transmittance above 50%.

(26) The laminate according to (22), (23) or (25) above, wherein the optically transparent member is formed of a resin film.

(27) The laminate according to any of (21) to (26) above, wherein the colorant content in the PSA layer is 1% by weight or higher and 10% by weight or lower.

(28) The laminate according to any of (21) to (27) above, wherein the PSA layer comprises a black colorant as the first colorant and a metal oxide as the second colorant.

(29) The laminate according to (28) above, wherein the metal oxide content in the PSA layer is 1% by weight or higher and 6% by weight or lower.

(30) The laminate according to (28) or (29) above, wherein the black colorant content in the PSA layer is below 2% by weight.

(31) The laminate according to any of (28) to (30) above, wherein the first colorant contained in an amount C1 and the second colorant contained in an amount C2 satisfy a ratio (C1/C2) by weight in the range between 0.01 and 0.30.

(32) The laminate according to any of (21) to (31) above, wherein the PSA layer is an acrylic PSA layer comprising an acrylic polymer as a base polymer.

(33) The laminate according to any of (21) to (32) above, wherein the PSA layer has a thickness in the range between 10 μm and 50 μm.

(34) The laminate according to any of (21) to (33) above, wherein the PSA sheet is a substrate-free adhesively double-faced PSA sheet formed of the PSA layer.

(35) The laminate according to any of (21) to (34) above, that is used in a portable electronic device.

(36) A PSA composition comprising at least two species of colorants.

(37) The PSA composition according to (36) above, wherein the colorant content in the PSA composition is 1% by weight or higher and 10% by weight or lower on non-volatile basis.

(38) The PSA composition according to (36) or (37) above, wherein the PSA composition comprises a black colorant as the first colorant and a metal oxide as the second colorant.

(39) The PSA composition according to (38) above, wherein the metal oxide content in the PSA composition is 1% by weight or higher and 6% by weight or lower on non-volatile basis.

(40) The PSA composition according to (38) or (39) above, wherein the black colorant content in the PSA composition is below 2% by weight on non-volatile basis.

(41) The PSA composition according to any of (38) to (40) above, wherein the first colorant contained in an amount C1 and the second colorant contained in an amount C2 satisfy a ratio (C1/C2) by weight in the range between 0.01 and 0.30.

(42) The PSA composition according to any of (36) to (41) above, the PSA composition comprising an acrylic polymer as a base polymer.

(43) The PSA composition according to any of (36) to (42) above for use in forming a PSA layer having a light transmittance of 30% or lower and a light reflectance of 8% or higher.

EXAMPLES

Several examples relating to the present invention will be described hereinbelow, but the present invention is not to be limited to these examples. In the description below, "parts" are by weight unless otherwise specified.
<Evaluation Methods>
[Light Transmittance]

The light transmittances (%) (at 550 nm wavelength) of PSA layers and PSA sheets are in the thickness directions of the PSA layers and PSA sheets peeled from release liners and are determined based on JIS K 7136:2000, using a commercial transmissometer. As the transmissometer, a spectrophotometer (model name U4150 SPECTROPHOTOMETER) available from Hitachi High-Tech Corporation or a comparable product is used.

[Light Reflectance]

The light reflectances (%) of the PSA layer surface and the PSA sheet surface are determined using a spectrophotometer, by irradiating a surface (the surface subject to light reflectance measurement) of the PSA layer or PSA sheet with 550 nm wavelength light and measuring the intensity of light reflected from the irradiated surface. As the spectrophotometer, for instance, a spectrophotometer (model name U-4150 SPECTROPHOTOMETER) available from Hitachi High-Tech Corporation can be used.

[180° Peel Strength (Adhesive Strength)]

In a measurement environment at 23° C. and 50% RH, to one adhesive face of a double-faced PSA sheet, 50 μm thick PET film is applied for backing. The resultant is cut into a 25 mm wide and 100 mm long size to prepare a measurement sample. In an environment at 23° C. and 50% RH, the adhesive face of the measurement sample is press-bonded to the surface of a stainless steel plate (SUS304BA plate) with a 2 kg roller moved back and forth once. The resultant is allowed to stand for 30 minutes in the same environment. Subsequently, based on JIS Z 0237:2000, using a universal tensile and compression tester, at a tensile speed of 300 mm/min at a peel angle of 180°, the peel strength (adhesive strength) (N/25 mm) is determined. As the universal tensile and compression tester, for instance, "tensile compression tester TG-1 kN" by Minebea Co., Ltd., or an equivalent device is used. Incase of a single-faced PSA sheet, the PET film backing is unnecessary.

[Shear Bonding Strength]

A PSA sheet (double-faced PSA sheet) is cut to a 10 mm×10 mm size to prepare a measurement sample. In an environment at 23° C. and 50% RH, the respective adhesive faces of the measurement sample are overlaid and press-bonded onto the surfaces of two stainless steel plates (SUS304BA plates) with a 2 kg roller moved back and forth once. The resultant is left standing for two days in the same environment. Subsequently, using a tensile tester, the shear bonding strength (MPa) is determined at a tensile speed of 10 mm/min at a peel angle of 0°. In case of an adhesively single-faced PSA sheet (single-faced PSA sheet), its non-adhesive face is fixed to a stainless steel plate with an adhesive or the like. Otherwise, the measurement can be carried out in the same manner as above. As the tensile tester, a universal tensile/compression tester (product name TG-1kN available from Minebea Co., Ltd.) can be used.

Example 1

(Preparation of Acrylic Polymer)

Into a reaction vessel equipped with a stirrer, thermometer, nitrogen inlet, condenser and dropping funnel, were placed 95 parts of n-butyl acrylate (BA) and 5 parts of acrylic acid (AA) as starting monomers and 233 parts of ethyl acetate as the polymerization solvent. The resulting mixture was allowed to stir under a nitrogen flow for two hours to eliminate oxygen from the polymerization system. Subsequently, was added 0.2 part of 2,2'-azobisisobutyronitrile (AIBN) as the polymerization initiator. The solution polymerization was carried out at 60° C. for eight hours to obtain a solution of acrylic polymer A. The acrylic polymer A had a Mw of about $70 \times 10^4$.

(Preparation of PSA Composition)

To the acrylic polymer solution, for every 100 parts of acrylic polymer A in the solution, were added 20 parts of a terpene-phenol resin as a tackifier resin, 3 parts of an isocyanate-based crosslinking agent and 0.01 part of an epoxy-based crosslinking agents as crosslinking agents. To this, were further added carbon black particles (product name ATDN101 BLACK available from Dainichiseika Color & Chemicals Mfg. Co., Ltd.; mean particle diameter: 350 nm) as the first colorant (black colorant) to 0.07% of PSA layer and titanium dioxide ($TiO_2$) particles (product name WHITE PASTE R-2228 available from Dainichiseika Color & Chemicals Mfg. Co., Ltd.; mean particle diameter: 50 nm) as the second colorant (metal oxide) to 5.10% of PSA layer. The resultant was stirred and mixed to prepare a PSA composition. As the terpene-phenol resin (tackifier resin), was used product name YS POLYSTAR T-115 (available from Yasuhara Chemical Co., Ltd.; softening point ~115° C., hydroxyl value 30-60 mgKOH/g). As the isocyanate-based crosslinking agent, was used product name CORONATE L (available from Tosoh Corporation; a 75% ethyl acetate solution of a trimethylolpropane/tolylene diisocyanate trimer adduct). As the epoxy-based crosslinking agent, was used product name TETRAD-C (available from Mitsubishi Gas Chemical Co., Inc.; 1,3-bis(N,N-diglycidylaminomethyl)cyclohexane).

(Preparation of PSA Sheet)

To the release face of a 38 μm thick polyester release film (product name DIAFOIL MRF available from Mitsubishi Polyester Film Inc.), was applied the PSA composition and allowed to dry at 100° C. for two minutes to form a 35 μm thick PSA layer. To the PSA layer, was adhered the release face of a 25 μm thick polyester release liner (product name DIAFOIL MRF available from Mitsubishi Polyester Film Inc.). In this manner, was obtained a 35 μm thick substrate-free double-faced PSA sheet with both faces protected with the two polyester release liners.

Examples 2 to 4

The amount of carbon black particles in the PSA layer was changed to 0.15% (Ex. 2), 0.57% (Ex. 3) or 0.30% (Ex. 4). The amount of titanium dioxide particles was changed to 4.54% (Ex. 2), 4.48% (Ex. 3) or 2.33% (Ex. 4). Otherwise in the same manner as Example 1, was prepared a PSA composition according to each Example; and using the PSA composition, was prepared a double-faced PSA sheet without substrate according to each Example.

Example 5

The monomer composition was changed to 95 parts of 2-ethylhexyl acrylate (2EHA) and 5 parts of AA. Otherwise, in the same manner as the synthesis of acrylic polymer A, was synthesized acrylic polymer B to obtain a solution of acrylic polymer B. To the acrylic polymer solution, for every 100 parts of acrylic polymer B in the solution, were added 20 parts of a terpene-phenol resin as a tackifier resin, 10 parts of an acrylic oligomer, 3 parts of an isocyanate-based crosslinking agent and 0.03 part of an epoxy-based crosslinking agents as crosslinking agents. To this, were further added carbon black particles as the first colorant (black colorant) to 0.29% of PSA layer and titanium dioxide particles as the second colorant to 3.65% of PSA layer. The resultant was stirred and mixed to prepare a PSA composition. As for the terpene-phenol resin, isocyanate-based crosslinking agent, epoxy-based crosslinking agent, carbon black particles and titanium dioxide particles, were used the same kinds as those used in Example 1.

As the acrylic oligomer, was used the product prepared by the next method. In particular, into a reaction vessel equipped with a stirrer, thermometer, nitrogen inlet, reflux condenser and addition funnel, were added 95 parts of cyclohexyl methacrylate (CHMA) and 5 parts of AA, 10 parts of AIBN as polymerization initiator, and toluene as polymerization solvent. Under a nitrogen flow, the mixture was stirred for one hour to eliminate oxygen from the polymerization system and then was heated to 85° C. The reaction was carried out for five hours to obtain an acrylic oligomer (50% non-volatiles). The resulting acrylic oligomer had Mw of 3600.

Using the resulting PSA composition, but otherwise in the same manner as Example 1, was obtained a 35 μm thick substrate-free double-faced PSA sheet, with the two faces protected with the two polyester release liners.

Examples 6 to 7

The amount of carbon black particles in the PSA layer was changed to 0.31% (Ex. 6) or 0.40% (Ex. 7). The amount of titanium dioxide particles was changed to 5.10% (Ex. 6) or 4.13% (Ex. 7). Otherwise in the same manner as Example 5, was prepared a PSA composition according to each Example; and using the PSA composition, was prepared a substrate-free double-faced PSA sheet according to each Example.

Examples 8 to 9

The amount of carbon black particles in the PSA layer was changed to 0.43% (Ex. 8) or 0.88% (Ex. 9). The amount of titanium dioxide particles was changed to 4.65% (Ex. 8) or 2.29% (Ex. 9). Otherwise in the same manner as Example 1, was prepared a PSA composition according to each Example; and using the PSA composition, was prepared a substrate-free double-faced PSA sheet according to each Example.

Examples 10 to 11

Titanium dioxide particles were not used. The amount of carbon black particles in the PSA layer was changed to 2.00% (Ex. 10) or 1.34% (Ex. 11). Otherwise in the same manner as Example 1, was prepared a PSA composition according to each Example; and using the PSA composition, was prepared a substrate-free double-faced PSA sheet according to each Example.

Table 1 summarizes the PSAs according to the respective Examples and shows the evaluation results of light transmittance, light reflectance, adhesive strength and shear bonding strength.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Acrylic polymer | A | A | A | A | B | B | B | A | A | A | A |
| Black colorant C1 (%) | 0.07 | 0.15 | 0.57 | 0.30 | 0.29 | 0.31 | 0.40 | 0.43 | 0.88 | 2.00 | 1.34 |
| Metal oxide particles C2 (%) | 5.10 | 4.54 | 4.48 | 2.33 | 3.65 | 5.10 | 4.13 | 4.65 | 2.29 | 0.00 | 0.00 |
| C1/C2 | 0.01 | 0.03 | 0.13 | 0.13 | 0.08 | 0.06 | 0.10 | 0.09 | 0.38 | — | — |
| Total colorant content (%) | 5.17 | 4.69 | 5.05 | 2.63 | 3.94 | 5.41 | 4.53 | 5.08 | 3.17 | 2.00 | 1.34 |
| Light transmittance (%) | 18.92 | 15.04 | 3.94 | 16.52 | 9.49 | 6.89 | 4.22 | 1.97 | 6.13 | 3.70 | 9.48 |
| Light reflectance (%) | 28.14 | 18.14 | 8.57 | 9.09 | 12.08 | 14.27 | 9.43 | 9.45 | 6.27 | 4.20 | 4.20 |
| Adhesive strength (N/25 mm) | 18 | 18 | 18 | 18 | 20 | 20 | 20 | 18 | 18 | 18 | 18 |
| Shear bonding strength (MPa) | 2.3 | 2.3 | 2.3 | 2.3 | 2.1 | 2.1 | 2.1 | 2.3 | 2.3 | 2.3 | 2.3 |

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

1 PSA sheet
1A adhesive face, first adhesive face
1B adhesive face, second adhesive face
21 PSA layer
21A adhesive face, first adhesive face
21B adhesive face, second adhesive face
31, 32 release liners

The invention claimed is:
1. A display device comprising a display and a support, wherein
the display comprises a cover member and an organic electroluminescence unit,
the display device further comprises a pressure-sensitive adhesive sheet attached to the support,
the pressure-sensitive adhesive sheet has a pressure-sensitive adhesive layer comprising a black colorant as a first colorant and a metal oxide as a second colorant, and
the pressure-sensitive adhesive layer has a light transmittance of 30% or lower and a light reflectance of 8% or higher.

2. A pressure-sensitive adhesive composition comprising:
a base polymer;
a tackifier resin having a softening point of 80° C. or higher; and
at least two species of colorants,
wherein the tackifier resin is contained in an amount of 20 parts by weight or less to 100 parts by weight of the base polymer, and
the colorants are contained in an amount of 1% by weight or higher and 30% by weight or lower on non-volatile basis.

3. The pressure-sensitive adhesive composition according to claim 2, wherein the pressure-sensitive adhesive composition contains the colorant in an amount of 1% by weight or higher and 10% by weight or lower on non-volatile basis.

4. The pressure-sensitive adhesive composition according to claim 2, wherein the pressure-sensitive adhesive composition comprises a black colorant as a first colorant and a metal oxide as a second colorant.

5. A pressure-sensitive adhesive sheet having a pressure-sensitive adhesive layer, wherein
the pressure sensitive adhesive sheet is an adhesively double-faced pressure-sensitive adhesive sheet having a non-releasable substrate and the pressure-sensitive layer on each face of the non-releasable substrate, or an adhesively double-faced pressure-sensitive adhesive sheet consisting of the pressure-sensitive adhesive layer,
the pressure-sensitive adhesive layer comprises at least two species of colorants, and
the pressure-sensitive adhesive layer has a light transmittance of 30% or lower and a light reflectance of 8% or higher.

6. The pressure-sensitive adhesive sheet according to claim 5, wherein the pressure-sensitive adhesive layer contains the colorants in an amount of 1% by weight or higher and 10% by weight or lower.

7. The pressure-sensitive adhesive sheet according to claim 5, wherein the pressure-sensitive adhesive layer comprises a black colorant as a first colorant and a metal oxide as a second colorant.

8. The pressure-sensitive adhesive sheet according to claim 7, wherein the pressure-sensitive adhesive layer contains the metal oxide in an amount of 1% by weight or higher and 6% by weight or lower.

9. The pressure-sensitive adhesive sheet according to claim 7, wherein the pressure-sensitive adhesive layer contains the black colorant in an amount below 2% by weight.

10. The pressure-sensitive adhesive sheet according to claim 7, wherein the first colorant contained in an amount C1 and the second colorant contained in an amount C2 satisfy a ratio (C1/C2) by weight in the range between 0.01 and 0.30.

11. The pressure-sensitive adhesive sheet according to claim 5, wherein the pressure-sensitive adhesive layer is an acrylic pressure-sensitive adhesive layer comprising an acrylic polymer as a base polymer.

12. The pressure-sensitive adhesive sheet according to claim 5, wherein the pressure-sensitive adhesive layer has a thickness in the range between 10 μm and 50 μm.

13. The pressure-sensitive adhesive sheet according to claim 5, wherein the pressure-sensitive adhesive sheet is the adhesively double-faced pressure-sensitive adhesive sheet consisting of the pressure-sensitive adhesive layer.

14. The pressure-sensitive adhesive sheet according to claim 5, for use in joining a member in a portable electronic device.

15. The pressure-sensitive adhesive composition according to claim 2, wherein the pressure-sensitive adhesive composition comprises a black colorant as a first colorant and a metal oxide as a second colorant, and
the first colorant contained in an amount C1 and the second colorant contained in an amount C2 satisfy a ratio (C1/C2) by weight of 0.001 to 0.50.

16. The pressure-sensitive adhesive composition according to claim 2, wherein the pressure-sensitive adhesive composition comprises an acrylic oligomer.

17. The pressure-sensitive adhesive composition according to claim 2, wherein the pressure-sensitive adhesive composition comprises an acrylic oligomer having a weight average molecular weight below $10 \times 10^4$.

18. The pressure-sensitive adhesive composition according to claim 2, wherein the pressure-sensitive adhesive composition comprises an isocyanate-based crosslinking agent and an epoxy-based crosslinking agent.

19. The pressure-sensitive adhesive sheet according to claim 5, wherein the pressure-sensitive adhesive layer comprises an acrylic oligomer.

20. The pressure-sensitive adhesive sheet according to claim 5, wherein the pressure-sensitive adhesive layer comprises an isocyanate-based crosslinking agent and an epoxy-based crosslinking agent.

* * * * *